US011184733B2

(12) United States Patent
Nakano et al.

(10) Patent No.: US 11,184,733 B2
(45) Date of Patent: Nov. 23, 2021

(54) MOBILE TERMINAL AND INFORMATION PROVIDING SYSTEM

(71) Applicant: Mitsubishi Electric Corporation, Tokyo (JP)

(72) Inventors: Satoshi Nakano, Tokyo (JP); Makoto Katsukura, Tokyo (JP); Taichi Ishizaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/958,293

(22) PCT Filed: Mar. 9, 2018

(86) PCT No.: PCT/JP2018/009307
§ 371 (c)(1),
(2) Date: Jun. 26, 2020

(87) PCT Pub. No.: WO2019/171594
PCT Pub. Date: Sep. 12, 2019

(65) Prior Publication Data
US 2021/0058734 A1 Feb. 25, 2021

(51) Int. Cl.
*H04W 4/021* (2018.01)
*H04M 1/725* (2021.01)
(Continued)

(52) U.S. Cl.
CPC ....... *H04W 4/021* (2013.01); *H04M 1/72403* (2021.01); *H04M 1/72457* (2021.01)

(58) Field of Classification Search
CPC ............. H04W 4/021; H04M 1/72457; H04M 1/72403; H04M 11/007; G06F 21/305; H04L 12/2814
See application file for complete search history.

(56) References Cited

U.S. PATENT DOCUMENTS

2015/0348049 A1* 12/2015 Todasco ................ G06Q 10/02
705/5
2019/0342942 A1* 11/2019 Deros .................... H04W 84/12
(Continued)

FOREIGN PATENT DOCUMENTS

JP      2005-151507 A    6/2005
JP      2014-21610 A     2/2014
(Continued)

OTHER PUBLICATIONS

Extended European Search Report dated Feb. 4, 2021 issued in corresponding EP patent application No. 18908341.3.
(Continued)

*Primary Examiner* — Minjung Kim
(74) *Attorney, Agent, or Firm* — Posz Law Group, PLC

(57) ABSTRACT

A mobile terminal capable of obtaining information provided from a server includes: a communication unit capable of communicating with, via a first communication path, an associated terminal in one of a plurality of areas, the associated terminal being placed in the one of the plurality of areas, being a terminal associated with the mobile terminal, and being one of a plurality of area terminals placed in corresponding ones of the plurality of areas; and a display unit capable of displaying service information provided from the server, the service information including first information and second information different from the first information. The display unit displays the first information when the communication unit is able to communicate with the associated terminal, or displays the second information when the communication unit is unable to communicate with the associated terminal.

13 Claims, 18 Drawing Sheets

(51) Int. Cl.
H04M 1/72457 (2021.01)
H04M 1/72403 (2021.01)

(56) References Cited

U.S. PATENT DOCUMENTS

2020/0068246 A1* 2/2020 Warrick .............. G06F 21/6236
2020/0302345 A1* 9/2020 Drance ................. G06Q 10/02

FOREIGN PATENT DOCUMENTS

| | | |
|---|---|---|
| JP | 2014-021610 A | 2/2014 |
| JP | 2014-033338 A | 2/2014 |
| JP | 2014-192587 A | 10/2014 |
| JP | 2015-070424 A | 4/2015 |
| WO | 2015183388 A1 | 12/2015 |

OTHER PUBLICATIONS

International Search Report of the International Searching Authority dated Jun. 5, 2018 for the corresponding International application No. PCT/JP2018/009307 (and English translation).

* cited by examiner

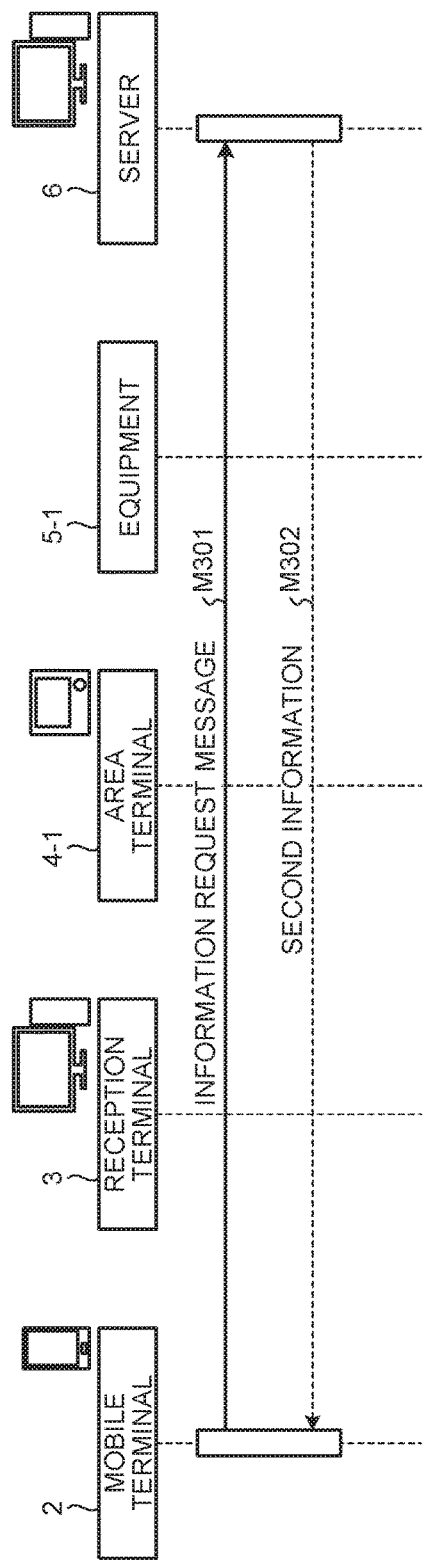

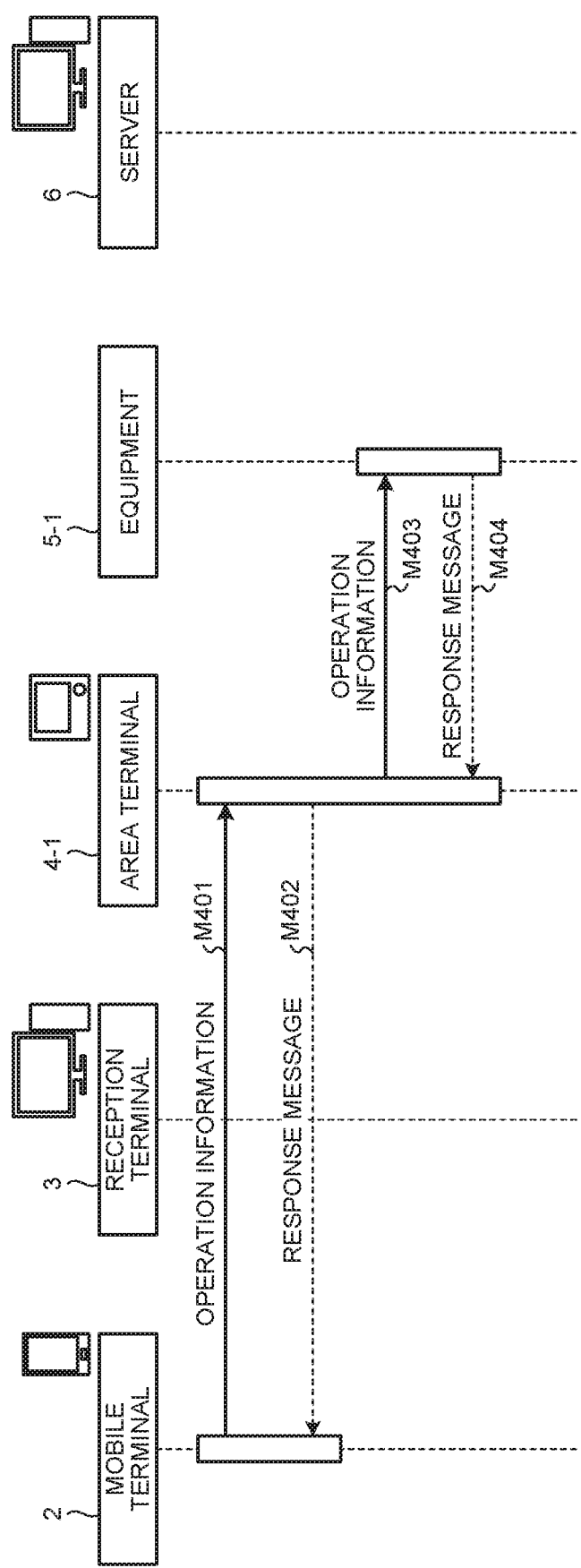

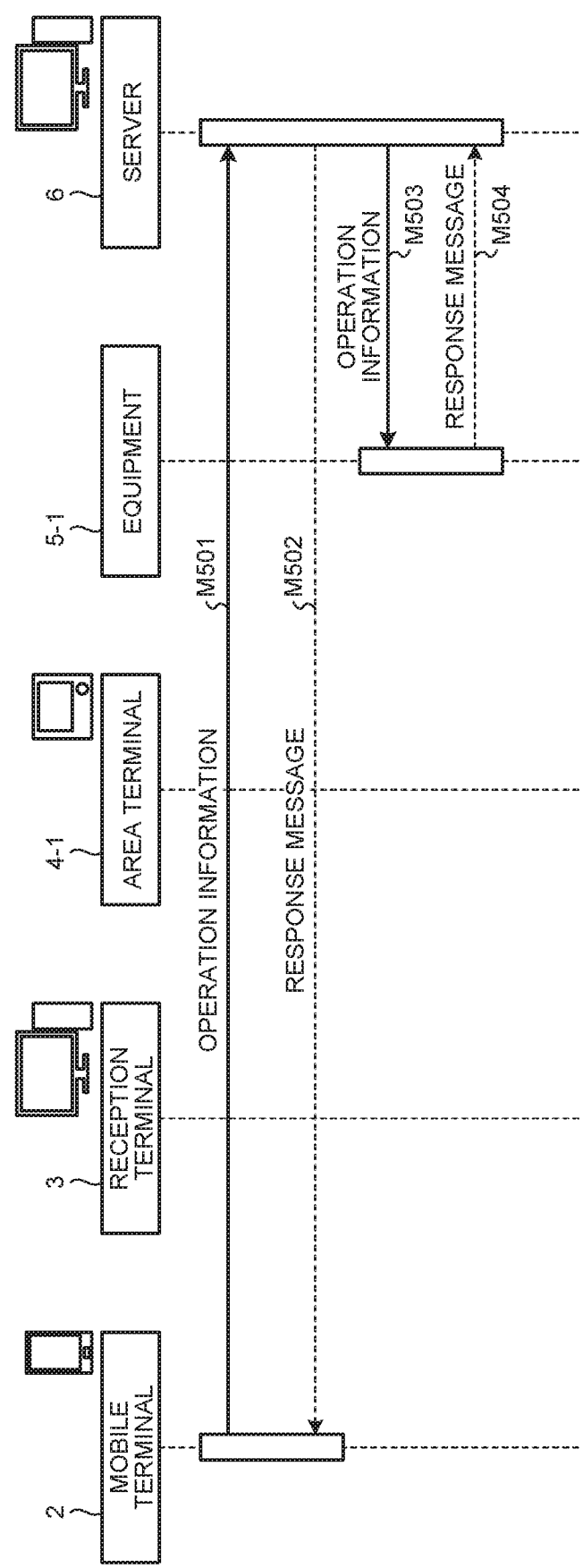

MOBILE TERMINAL AND INFORMATION PROVIDING SYSTEM

CROSS REFERENCE TO RELATED APPLICATION

This application is a U.S. national stage application of International Patent Application No. PCT/JP2018/009307 filed on Mar. 9, 2018, the disclosure of which is incorporated herein by reference.

TECHNICAL FIELD

The present invention relates to a mobile terminal and an information providing system capable of providing information in accordance with a location of a user.

BACKGROUND

In recent years, mobile terminals such as smartphones and tablet terminals have become widespread, and it is becoming common for users to each carry one or more mobile terminals. In order to provide more useful information for each user, a system has been proposed that estimates a state of a user by detecting a state of a mobile terminal owned by the user and provides information in accordance with the state of the user.

Patent Literature 1 discloses a technique for distributing information in accordance with a location of a user on the basis of positioning information of a mobile terminal. Specifically, an information distribution device specifies users staying in an area to which information is to be distributed on the basis of positioning information and distributes, to a user who has not yet stayed in a sub-area among the users who have been specified, a piece of information associated with the sub-area in which the user has not yet stayed at a predetermined timing.

PATENT LITERATURE

Patent Literature 1: Japanese Patent Application Laid-open No. 2014-192587

However, in the technique described in Patent Literature 1, the area to which information is to be distributed is common regardless of the user. Thus, when an area associated with a user is specified for each user such as when a guest room is associated with a user in an accommodation facility, the technique described in Patent Literature 1 has a problem in that it is difficult to provide information on the basis of whether or not the user is in the associated area.

SUMMARY

The present invention has been made in view of the above, and an object of the present invention is to provide a mobile terminal capable of providing information on the basis of whether or not a user is in an associated area when the associated area is specified for each user.

To solve the above problem and achieve an object, a mobile terminal capable of obtaining information provided from a server, includes: a communication unit capable of communicating with, via a first communication path, an associated terminal in one of a plurality of areas, the associated terminal being placed in the one of the plurality of areas, the associated terminal being a terminal associated with the mobile terminal, and the associated terminal being one of a plurality of area terminals correspondingly placed in the plurality of areas; and a display unit capable of displaying service information, the service information being provided from the server and comprising first information and second information different from the first information, wherein when the communication unit is able to communicate with the associated terminal, the display unit displays the first information, and when the communication unit is unable to communicate with the associated terminal, the display unit displays the second information.

The mobile terminal according to the present invention has an effect of being able to provide information on the basis of whether or not the user is in the associated area when the associated area is specified for each user.

BRIEF DESCRIPTION OF DRAWINGS

FIG. 20 is a data flow diagram illustrating a data flow in a step of displaying second information, the step being illustrated in FIG. 11.

FIG. 21 is a data flow diagram illustrating a data flow in a step of operating equipment via a first communication path, the step being illustrated in FIG. 11.

FIG. 22 is a data flow diagram illustrating a data flow in a step of operating equipment via a second communication path, the step being illustrated in FIG. 11.

DETAILED DESCRIPTION

Hereinafter, a mobile terminal and an information providing system according to an embodiment of the present invention will be described in detail with reference to the drawings. Note that the present invention is not limited to the embodiment.

Embodiment

Figure 1:
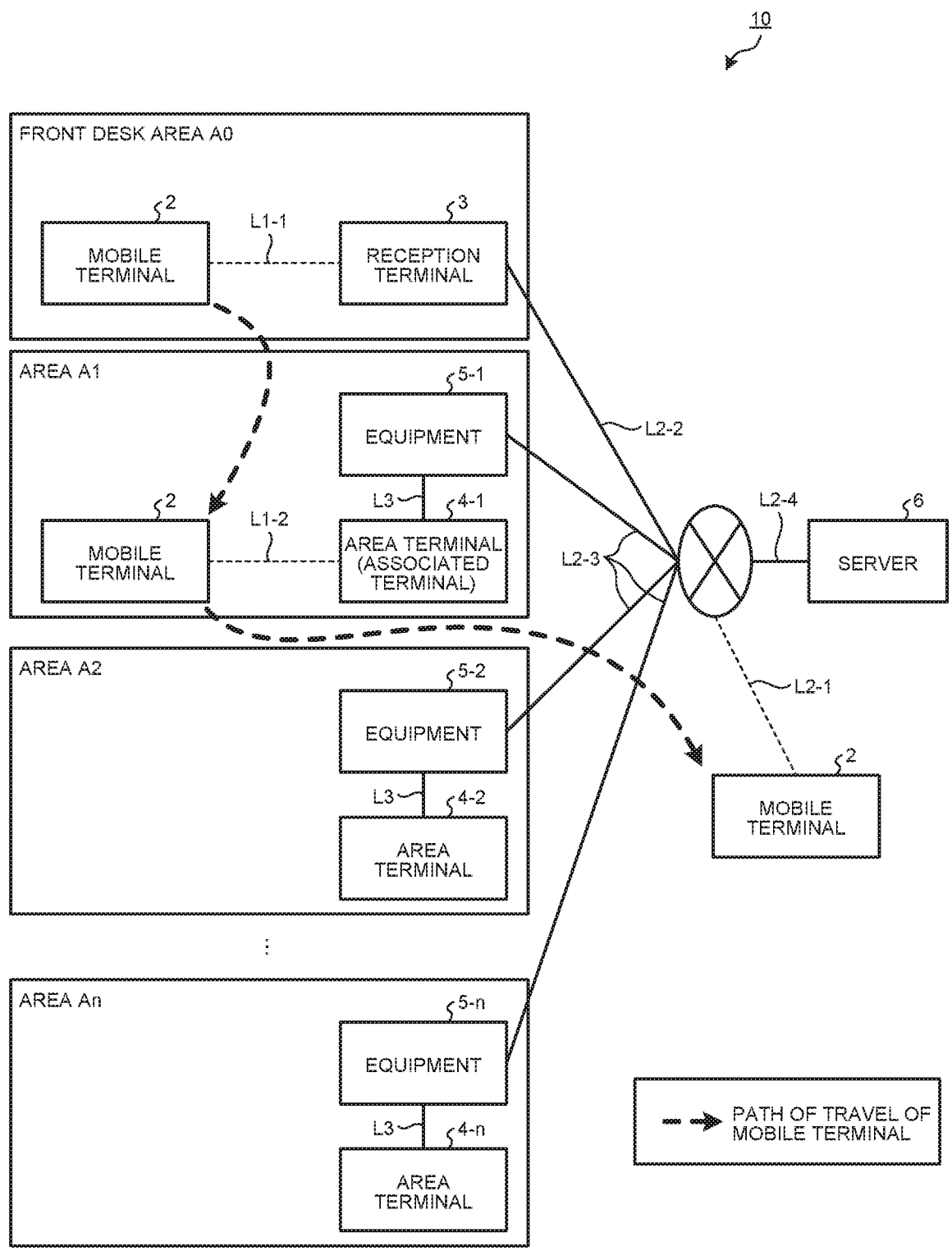
FIG. 1 is a diagram illustrating a configuration of an information providing system according to an embodiment of the present invention.

FIG. 1 is a diagram illustrating a configuration of an information providing system 10 according to an embodiment of the present invention. The information providing system 10 includes a mobile terminal 2 used and portable by a user, a reception terminal 3 installed in a front desk area A0, a plurality of area terminals 4-1 and 4-2 to 4-n placed in corresponding ones of a plurality of areas A1 and A2 to An, a plurality of pieces of equipment 5-1 and 5-2 to 5-n placed in corresponding ones of the plurality of areas A1 to An, and a server 6. The mobile terminal 2 can obtain information provided from the server 6. Hereinafter, the plurality of area terminals 4-1 to 4-n will be simply referred to as an area terminal 4 when not needing to be distinguished from one another, and the plurality of pieces of equipment 5-1 to 5-n will be simply referred to as equipment 5 when not needing to be distinguished from one another.

The front desk area A0 is a reception of a hotel being an accommodation facility, and is an area where not only guests but other people can access. Each of the areas A1 to An is an example of an area that can be rented out and used for a predetermined period, and is a guest room of the hotel. The mobile terminal 2 is a terminal owned by a user staying at the hotel. The mobile terminal 2 is a smartphone, a tablet terminal, a mobile phone, or the like. Because the mobile terminal 2 is carried by the user, the location of the mobile terminal 2 changes as the user moves. In the hotel, the user can move among a public area including the front desk area A0, corridors, a restaurant area, and the like and the guest room where the user stays. In the example illustrated in FIG. 1, the user of the mobile terminal 2 stays in a guest room corresponding to the area A1. Therefore, the mobile terminal 2 can move among outside the hotel, the public area including the front desk area A0, and the area A1.

The reception terminal 3 associates the mobile terminal 2 with one of the plurality of area terminals 4-1 to 4-n placed in the guest rooms of the hotel. Specifically, when the reception terminal 3 specifies the guest room where the user stays, the reception terminal 3 associates any one of the area terminals 4-1 to 4-n placed in the specified guest room with the mobile terminal. In a case where the user has reserved a guest room to stay, the reception terminal 3 can specify the guest room where the user stays by searching for reservation information using the name of the user, a reservation number, and the like. In a case where the user has not reserved a guest room to stay, the reception terminal 3 searches for and extracts vacant guest rooms to accept an operation selecting a guest room from among the guest rooms extracted, thereby being able to specify the selected guest room as the guest room where the user stays. The reception terminal 3 transmits identification information of the mobile terminal 2, identification information of the user, and identification information of the guest room or the area terminal 4 associated with the mobile terminal 2 to the server 6. In the example of FIG. 1, the user stays in the guest room corresponding to the area A1 so that the mobile terminal 2 is associated with the area terminal 4-1. Among the plurality of area terminals 4-1 to 4-n, the area terminal 4-1 associated with the mobile terminal 2 is also referred to as an associated terminal.

The reception terminal 3 can communicate with the mobile terminal 2 via a first communication path L1-1. The first communication path L1-1 is a short-range wireless communication path conforming to a communication standard such as Bluetooth (registered trademark). The reception terminal 3 is connected to a second communication path L2-2. The second communication path L2-2 is a communication path conforming to a communication standard such as Ethernet (registered trademark) which is different from that of the first communication path. The second communication path L2-2 may be a wired communication path or a wireless communication path.

The area terminal 4 is placed in each of the areas A1 to An. The area terminal 4 is, for example, a remote control of the equipment 5. The area terminal 4 is connected to the equipment 5 by an equipment communication line L3. When the user operates the area terminal 4, the area terminal 4 generates operation information for changing the operation setting of the equipment 5 on the basis of the user's operation, and can input the generated operation information to the equipment 5. Among the area terminals 4-1 to 4-n, the area terminal 4-1 associated with the mobile terminal 2 can communicate with the mobile terminal 2 via a first communication path L1-2. The area terminal 4-1 has a function of providing information obtained from the server 6 via the equipment 5-1 to the mobile terminal 2, and a function of passing the operation information of the equipment 5-1 input from the mobile terminal 2 to the equipment 5-1.

The equipment 5 is placed in each guest room of the hotel. The equipment 5 is an air conditioner, a lighting fixture, a water heater, an electric blind, or the like. The equipment 5 is connected to the area terminal 4 via the equipment communication line L3. The equipment 5 is connected to a second communication path L2-3. The equipment 5 can communicate with the server 6 via the second communication path L2-3.

The server 6 stores the correspondence between the mobile terminal 2 and the area terminal 4 received at the reception terminal 3. The server 6 has a function of providing information to the mobile terminal 2 on the basis of the correspondence, and a function of receiving the operation information of the equipment 5 input from the mobile terminal 2.

FIG. 1 uses a broken arrow to indicate a path of travel of the mobile terminal 2. When the user of the mobile terminal 2 requests a staff in the front desk area A0 to perform a check-in procedure in the front desk area A0, the staff uses the reception terminal 3 to associate the area terminal 4 placed in the guest room where the user stays with the mobile terminal 2 during the check-in procedure. After the check-in procedure is completed, when the user moves to the area A1 corresponding to the guest room where the user stays, the mobile terminal 2 can communicate with the area terminal 4-1 via the first communication path L1-2. The mobile terminal 2 can obtain service information, which is information provided by the server 6, from the area terminal 4-1 and display the service information obtained. The service information includes first information and second information different from the first information. The first information is the service information displayed when the mobile terminal 2 is in a first state of being able to communicate with the area terminal 4-1 via the first communication path L1-2. The second information is information displayed when the user goes out of the area A1 so that the mobile terminal 2 is in a second state of not being able to communicate with the area terminal 4-1 via the first communication path L1-2. The mobile terminal 2 can access the server 6 via a second communication path L2-1 and obtain the second information from the server 6. Alternatively, the mobile terminal 2 can obtain the second information while being able to communicate with the area terminal 4-1 via the first communication path L1-2.

Figure 2:
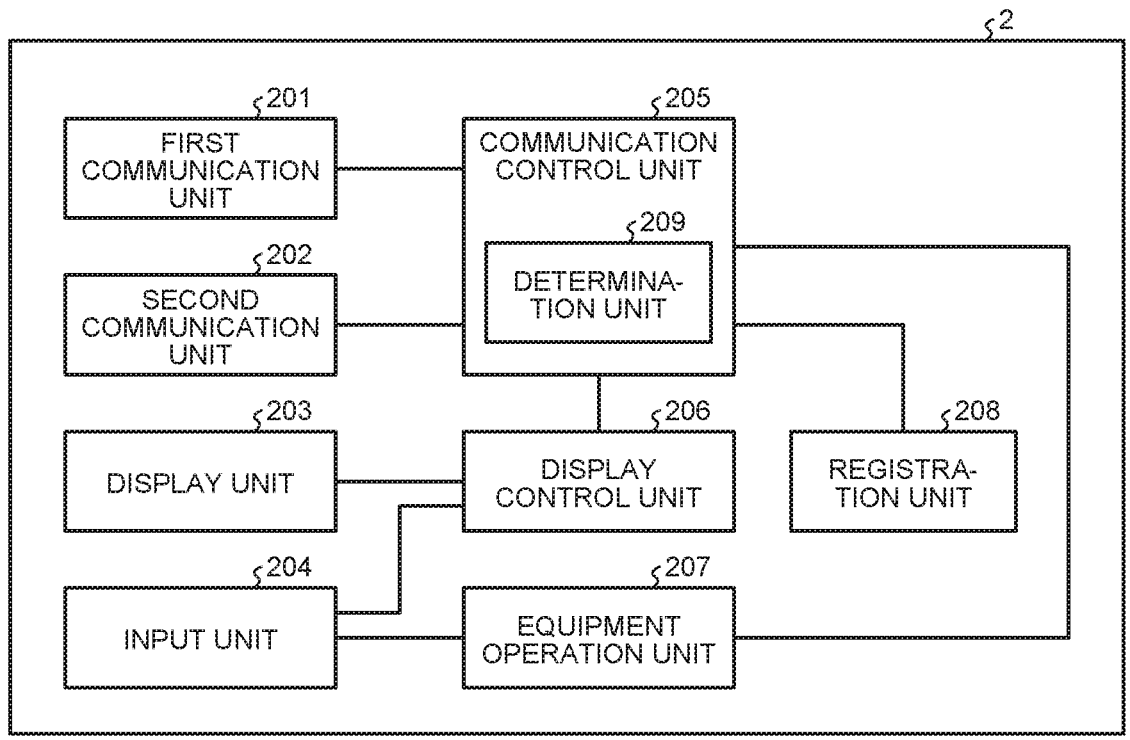
FIG. 2 is a diagram illustrating a functional configuration of a mobile terminal illustrated in FIG. 1.

The configuration of each device for implementing the functions of the information providing system 10 described above will be described. FIG. 2 is a diagram illustrating a functional configuration of the mobile terminal 2 illustrated in FIG. 1. The mobile terminal 2 includes a first communication unit 201, a second communication unit 202, a display unit 203, an input unit 204, a communication control unit 205, a display control unit 206, an equipment operation unit 207, and a registration unit 208. The communication control unit 205 includes a determination unit 209.

The first communication unit 201 is a communication unit that can communicate with the reception terminal 3 via the first communication path L1-1 and can communicate with the area terminal 4-1 via the first communication path L1-2 in one of the plurality of areas where the associated terminal is placed. The second communication unit 202 can connect to the Internet via the second communication path L2-1 and can communicate with the server 6.

The display unit 203 outputs a display screen under control of the display control unit 206. The display unit 203 can display the service information that is the information provided from the server 6 storing the correspondence between the mobile terminal 2 and the area terminal 4. The input unit 204 receives an input from a user, generates input information indicating the received input, and outputs the generated input information to the display control unit 206 and the equipment operation unit 207.

The communication control unit 205 controls the first communication unit 201 and the second communication unit 202 to communicate with a device other than the mobile terminal 2. The determination unit 209 determines whether or not the first communication unit 201 can communicate with the area terminal 4-1 associated with the mobile terminal 2. A method by which the determination unit 209 determines whether or not the mobile terminal 2 can communicate with the area terminal 4-1 is not particularly limited. For example, the mobile terminal 2 may repeatedly transmit a signal for checking communication to the area terminal 4-1 at a fixed cycle, and the determination unit 209 can determine that the first communication unit 201 cannot establish communication when a response to the signal for checking communication is not returned, or determine that the first communication unit 201 can establish communication when a response is returned. Alternatively, the area terminal 4-1 may repeatedly transmit a beacon signal for detecting communication at a fixed cycle, and the determination unit 209 can determine that communication can be established when the first communication unit 201 successively receives the beacon signal, or determine that communication cannot be established when the first communication unit 201 fails to receive the beacon signal.

The determination unit 209 outputs a result of the determination to the display control unit 206. When the determination unit 209 determines that the first communication unit 201 can communicate with the area terminal 4-1, it is assumed that the user of the mobile terminal 2 is in the guest room. When the determination unit 209 determines that the first communication unit 201 cannot communicate with the area terminal 4-1, it is assumed that the user is not in the guest room. The communication control unit 205 automatically starts communication with the area terminal 4-1 when detecting that the first communication unit 201 is located within a range where wireless communication can be established with the area terminal 4-1 via the first communication path L1-2.

The display control unit 206 changes the service information to be displayed on the display unit 203 on the basis of the result of the determination by the determination unit 209. When the determination unit 209 determines that the first communication unit 201 can communicate with the area terminal 4-1, the display control unit 206 causes the display unit 203 to display the first information as the service information. When the determination unit 209 determines that the first communication unit 201 cannot communicate with the area terminal 4-1, the display control unit 206 causes the display unit 203 to display the second information as the service information different from the first information. Therefore, the first information is displayed on the display unit 203 when the first communication unit 201 can communicate with the area terminal 4-1 being the associated terminal, and the second information is displayed on the display unit 203 when the first communication unit 201 cannot communicate with the area terminal 4-1. The first information includes information required when the user is in the area A1 in which the area terminal 4-1 is placed, and the second information includes information required when the user is not in the area A1.

When the mobile terminal 2 can communicate with the area terminal 4-1 via the first communication path L1-2, the display control unit 206 obtains the first information from the area terminal 4-1 via the first communication path L1-2 and causes the display unit 203 to display the first information obtained. When the mobile terminal 2 cannot communicate with the area terminal 4-1, the display control unit 206 obtains the second information from the server 6 via the second communication path L2-1 different from the first communication path L1-2, and causes the display unit 203 to display the second information obtained.

The display control unit 206 can also cause the display unit 203 to display an operation menu for operating the equipment 5 in addition to the service information. When the input unit 204 outputs the input information, the display control unit 206 can change the display screen displayed on the display unit 203 on the basis of the input information.

The equipment operation unit 207 receives, from the input unit 204, input information related to the operation menu for operating the equipment 5-1 that is connected to the area terminal 4-1 associated with the mobile terminal 2. The equipment operation unit 207 identifies an operation indicated by the input information received, generates operation information for operating the equipment 5-1 on the basis of the operation identified, and transmits the operation information to the area terminal 4-1 or the server 6.

When the mobile terminal 2 can communicate with the area terminal 4-1 via the first communication path L1-2, the equipment operation unit 207 may transmit the operation information to the area terminal 4-1 via the first communication path L1-2, or may transmit the operation information to the server 6 via the second communication path L2-1. When the mobile terminal 2 cannot communicate with the area terminal 4-1 via the first communication path L1-2, the equipment operation unit 207 transmits the operation information to the server 6 via the second communication path L2-1. The operation information transmitted to the area terminal 4-1 is input to the equipment 5-1 via the equipment communication line L3. The operation information transmitted to the server 6 is input to the equipment 5-1 via a second communication path L2-4 and the second communication path L2-3.

The registration unit 208 performs registration processing that associates the mobile terminal 2 with the area terminal 4. Specifically, the registration unit 208 communicates with the reception terminal 3 via the first communication path L1-1, and transmits identification information for identifying the mobile terminal 2 to the reception terminal 3. In a case where the user has been assigned a user ID, the registration unit 208 may transmit the user ID to the reception terminal 3.

Figure 3:
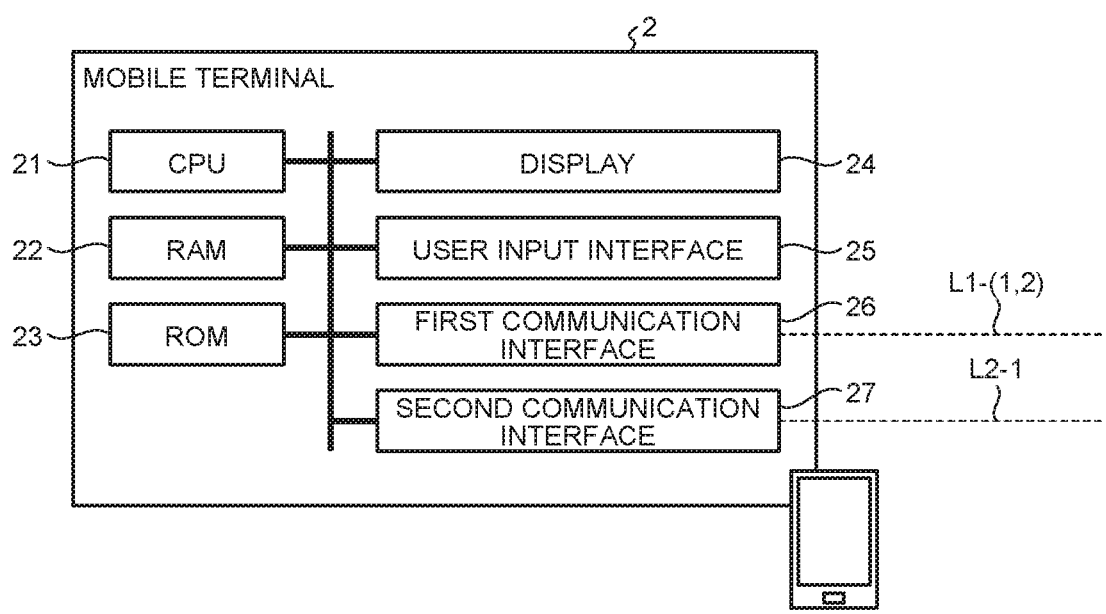
FIG. 3 is a diagram illustrating a hardware configuration of the mobile terminal illustrated in FIG. 1.

Next, a hardware configuration for implementing the functions of the mobile terminal 2 will be described. FIG. 3 is a diagram illustrating the hardware configuration of the mobile terminal 2 illustrated in FIG. 1. The mobile terminal 2 includes a central processing unit (CPU) 21, a random access memory (RAM) 22, a read only memory (ROM) 23, a display 24, a user input interface 25, a first communication interface 26, and a second communication interface 27.

The CPU 21 is processing circuitry that reads and executes a computer program stored in the ROM 23. The CPU 21 is also referred to as a central processor, a processing device, an arithmetic device, a microprocessor, a processor, a microcomputer, a digital signal processor (DSP), or the like.

The RAM 22 is a storage device in which data can be erased and rewritten, and is used as a main memory. The ROM 23 is a storage device into which data can be written only once and from which recorded data can be read when used. The ROM 23 can store the computer program to be executed by the CPU 21 and the like.

The display 24 is a liquid crystal display device, an organic electro luminescence (EL) display device, or the like and implements the function of the display unit 203 illustrated in FIG. 2. The mobile terminal 2 can provide a display screen to the user using the display 24. The user input interface 25 is an input device such as a touch panel that receives a user's input operation, and implements the function of the input unit 204 illustrated in FIG. 2. The touch panel may be a capacitive touch panel, for example. In the case where the user input interface 25 is the touch panel, the user input interface 25 is provided while overlaid on the display 24.

The first communication interface 26 is connected to the first communication paths L1-1 and L1-2, and implements the function of the first communication unit 201 illustrated in FIG. 2. The first communication interface 26 can perform communication using a short-range wireless communication system such as Bluetooth. The second communication interface 27 is connected to the second communication path L2-1. The second communication interface 27 can perform communication using a communication system such as a wireless local area network (LAN) different from that for the first communication paths L1-1 and L1-2. The second communication interface 27 implements the function of the second communication unit 202 illustrated in FIG. 2.

The functions of the communication control unit 205, the display control unit 206, the equipment operation unit 207, the registration unit 208, and the determination unit 209 are implemented by the CPU 21 reading and executing the computer program stored in the ROM 23 or the like.

Figure 4:
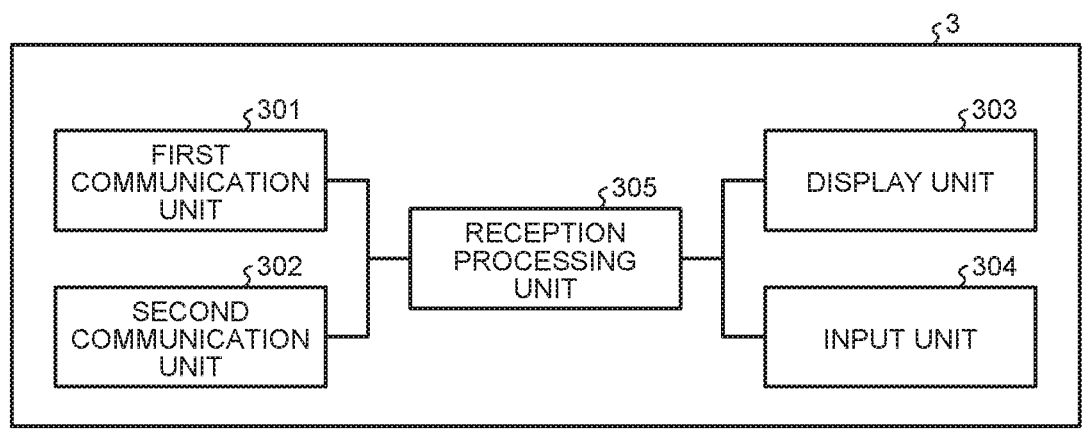
FIG. 4 is a diagram illustrating a functional configuration of a reception terminal illustrated in FIG. 1.

FIG. 4 is a diagram illustrating a functional configuration of the reception terminal 3 illustrated in FIG. 1. The reception terminal 3 includes a first communication unit 301, a second communication unit 302, a display unit 303, an input unit 304, and a reception processing unit 305.

The first communication unit 301 can communicate with the mobile terminal 2 via the first communication path L1-1, and the second communication unit 302 can communicate with the mobile terminal 2, the server 6, and the like via the second communication path L2-2.

The display unit 303 outputs a display screen in accordance with an instruction from the reception processing unit 305. The input unit 304 receives an input from a user, generates input information indicating the received input, and inputs the generated input information to the reception processing unit 305.

The reception processing unit 305 performs reception processing at the hotel. The reception processing includes check-in processing by which a user starts using a guest room of the hotel, and processing of associating the mobile terminal 2 with the area terminal 4. Specifically, when a staff operating the reception terminal 3 gets a keyword such as a name of a user who has made an accommodation reservation, a reservation number, or the like from the user, the staff inputs the keyword using the input unit 304 of the reception terminal 3. The reception processing unit 305 searches for accommodation reservation information of the user on the basis of the keyword received via the input unit 304, and specifies a room where the user stays. Alternatively, when the user has not made an accommodation reservation, the reception processing unit 305 searches for a vacant guest room and specifies a room where the user stays. Once the reception terminal 3 has specified the room where the user stays, the staff requests the user to operate the mobile terminal 2 and transmit terminal identification information for identifying the mobile terminal 2. The user performs the operation to transmit the terminal identification information using the mobile terminal 2, and then the reception processing unit 305 receives the terminal identification information from the mobile terminal 2 via the first communication unit 301. The reception processing unit 305 transfers user identification information, which includes information indicating the room specified, in association with the terminal identification information received, to the server 6. Note that the user identification information may include the name of the user who stays.

Figure 5:
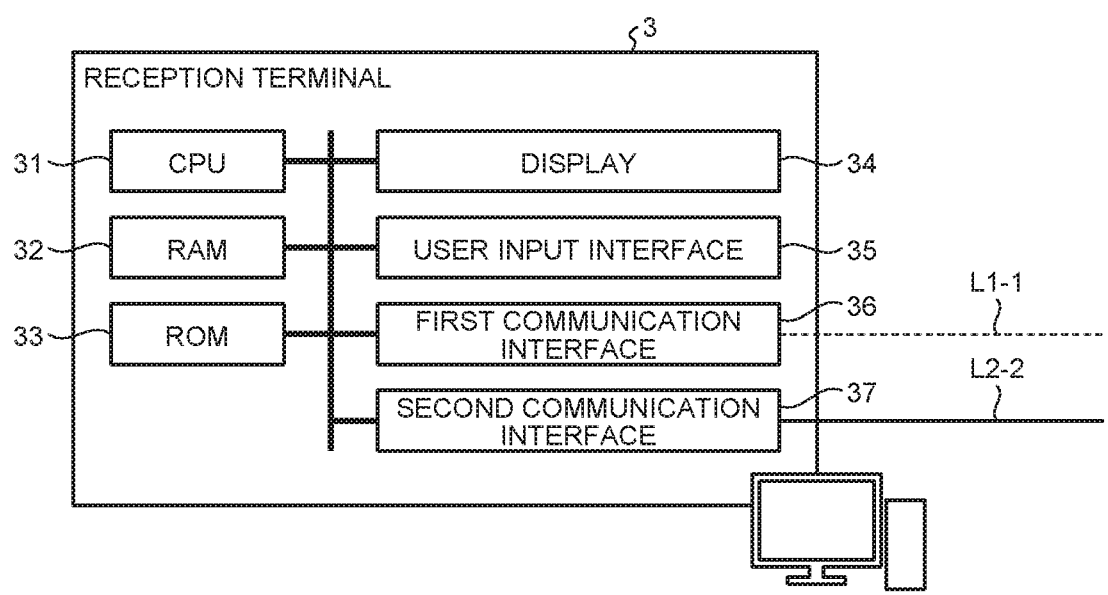
FIG. 5 is a diagram illustrating a hardware configuration of the reception terminal illustrated in FIG. 1.

FIG. 5 is a diagram illustrating a hardware configuration of the reception terminal 3 illustrated in FIG. 1. The reception terminal 3 includes a CPU 31, a RAM 32, a ROM 33, a display 34, a user input interface 35, a first communication interface 36, and a second communication interface 37.

The CPU 31 is similar to the CPU 21, the RAM 32 is similar to the RAM 22, the ROM 33 is similar to the ROM 23, and the display 34 is similar to the display 24 so that the description thereof will be omitted. The user input interface 35 is an input device such as a touch panel or a keyboard that receives a user's input operation. The user input interface 35 implements the function of the input unit 304 illustrated in FIG. 4.

The first communication interface 36 is connected to the first communication path L1-1 and implements the function of the first communication unit 301 illustrated in FIG. 4. The first communication interface 36 can perform communication using a short-range wireless communication system such as Bluetooth. The second communication interface 37 is connected to the second communication path L2-2 and implements the function of the second communication unit 302 illustrated in FIG. 4. The second communication interface 37 can perform communication using a communication system such as a wireless LAN different from that for the first communication path L1-1.

The function of the reception processing unit 305 illustrated in FIG. 4 is implemented by the CPU 31 reading and executing a computer program stored in the ROM 33 or the like. The display 34 implements the function of the display unit 303 illustrated in FIG. 4.

Figure 6:
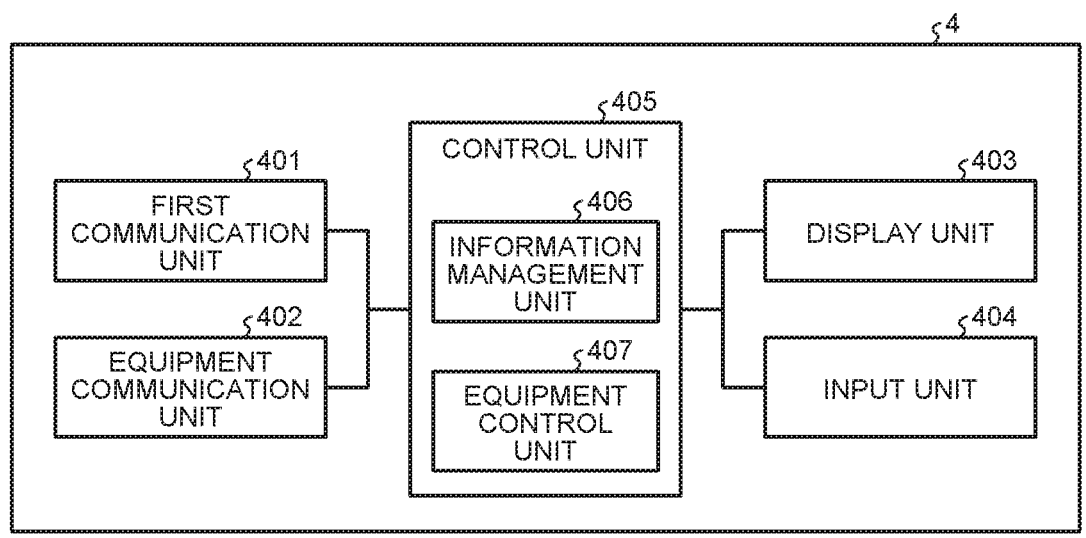
FIG. 6 is a diagram illustrating a functional configuration of an area terminal illustrated in FIG. 1.

FIG. 6 is a diagram illustrating a functional configuration of the area terminal 4 illustrated in FIG. 1. The area terminal 4 includes a first communication unit 401, an equipment communication unit 402, a display unit 403, an input unit 404, and a control unit 405. The control unit 405 includes an information management unit 406 and an equipment control unit 407.

The first communication unit 401 can communicate with the mobile terminal 2 via the first communication path L1-2. The equipment communication unit 402 can communicate with the equipment 5 placed in the same area as the area terminal 4.

The display unit 403 outputs a display screen in accordance with an instruction from the control unit 405. The display screen includes an operation screen for performing an operation on the equipment 5, an information display screen for providing information to a user, and the like. The input unit 404 receives an input from a user, generates input information indicating the received input, and outputs the generated input information to the control unit 405.

The control unit 405 controls the area terminal 4 to be able to provide information to the mobile terminal 2 communicating therewith via the first communication unit 401, and transfer operation information of the equipment 5 input from the mobile terminal 2 to the equipment 5.

The information management unit 406 manages information provided to the mobile terminal 2. The information management unit 406 periodically obtains, from the server 6, the service information to be provided to the mobile terminal 2 associated with the area terminal 4 via the equipment communication unit 402. When enabled to communicate with the mobile terminal 2 via the first communication unit 401, the information management unit 406 provides the mobile terminal 2 with the service information obtained from the server 6.

The equipment control unit 407 can cause the display unit 403 to display an operation menu for operating the equipment 5 placed in the same area as the area terminal 4. Upon receiving input information for the operation menu from the input unit 404, the equipment control unit 407 generates operation information for operating the equipment 5 on the basis of the input information, and transmits the generated operation information to the equipment 5 via the equipment communication unit 402. The equipment control unit 407 can receive operation information for operating the equipment 5 from the mobile terminal 2. Upon receiving the operation information from the mobile terminal 2, the equipment control unit 407 transmits the received operation information to the equipment 5 via the equipment communication unit 402.

Figure 7:
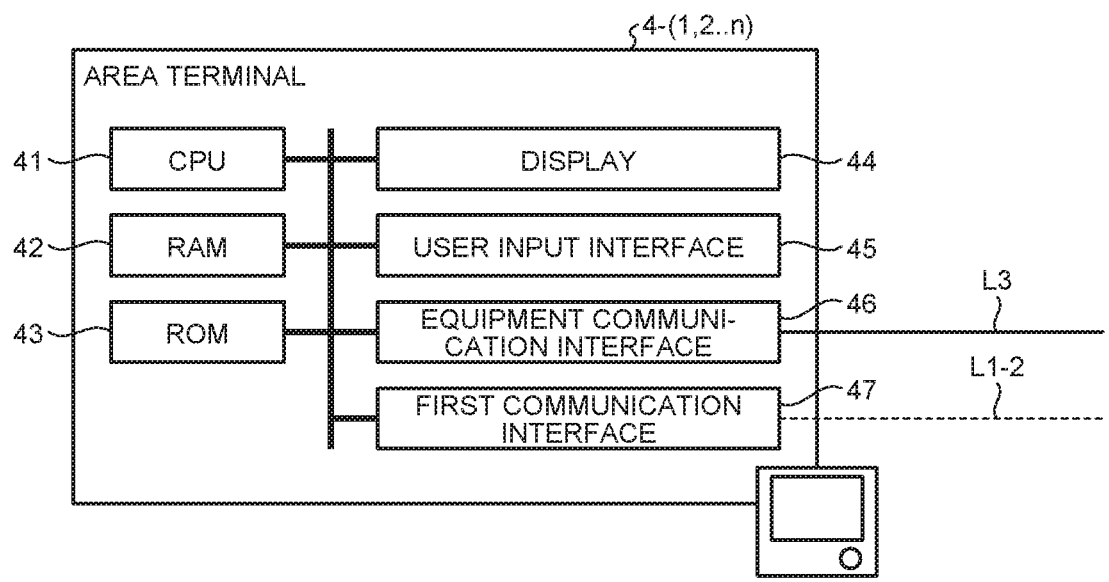
FIG. 7 is a diagram illustrating a hardware configuration of the area terminal illustrated in FIG. 1.

FIG. 7 is a diagram illustrating a hardware configuration of the area terminal 4 illustrated in FIG. 1. The area terminal 4 includes a CPU 41, a RAM 42, a ROM 43, a display 44, a user input interface 45, an equipment communication interface 46, and a first communication interface 47.

The CPU 41 is similar to the CPU 21, the RAM 42 is similar to the RAM 22, the ROM 43 is similar to the ROM 23, and the display 44 is similar to the display 24 so that the description thereof will be omitted. The user input interface 45 is an input device such as a touch panel or a button that receives a user's input operation, and implements the function of the input unit 404 illustrated in FIG. 6.

The equipment communication interface 46 is connected to the equipment communication line L3, and implements the function of the equipment communication unit 402 illustrated in FIG. 6. The equipment communication interface 46 can communicate with the equipment 5 via the equipment communication line L3. The first communication interface 47 is connected to the first communication path L1-2. The first communication interface 47 can perform communication using a short-range wireless communication system such as Bluetooth.

The functions of the control unit 405, the information management unit 406, and the equipment control unit 407 illustrated in FIG. 6 are implemented by the CPU 41 reading and executing a computer program stored in the ROM 43 or the like. The display 44 implements the function of the display unit 403 illustrated in FIG. 6.

Figure 8:
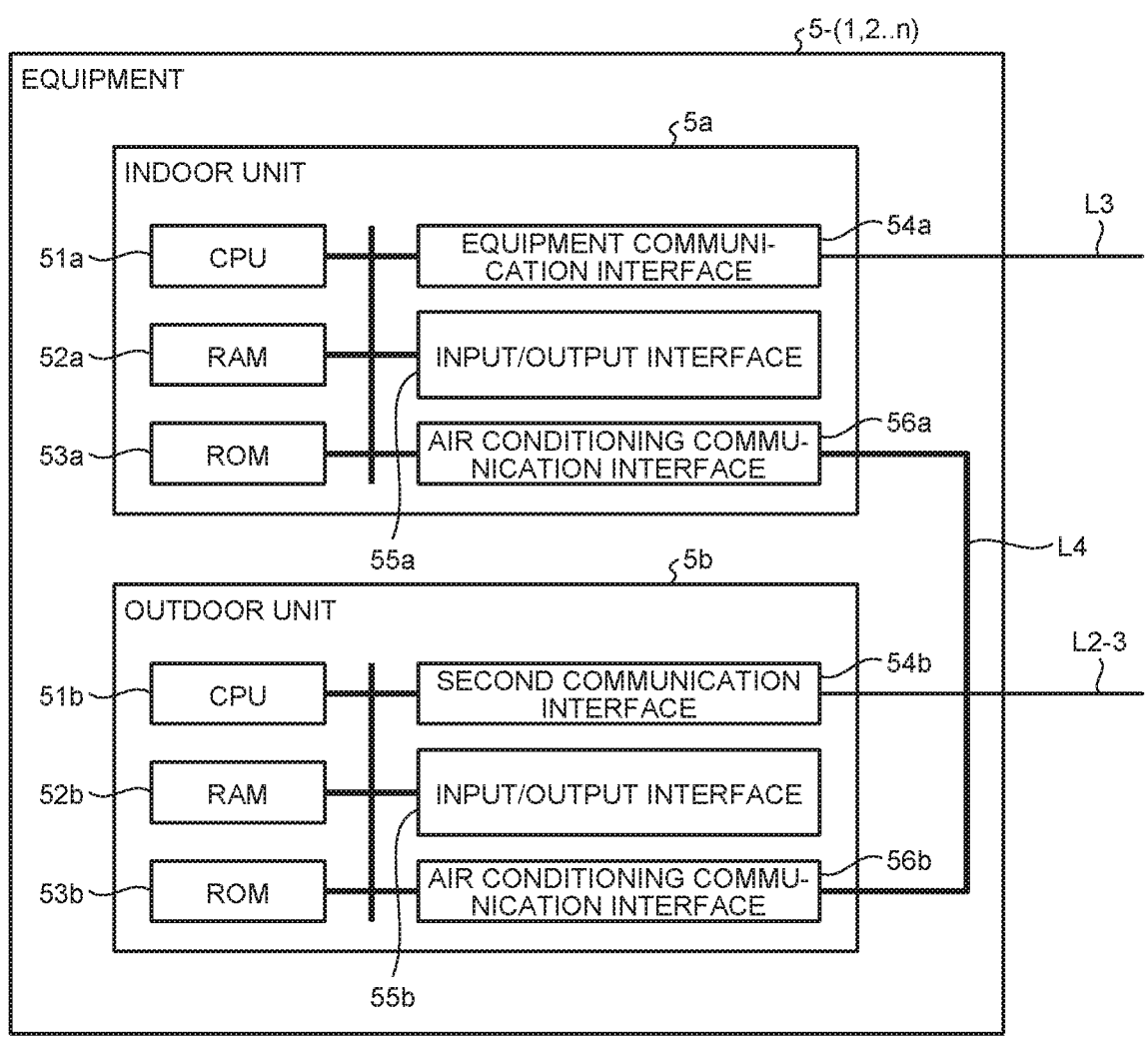
FIG. 8 is a diagram illustrating a configuration of a piece of equipment illustrated in FIG. 1.

FIG. 8 is a diagram illustrating a configuration of the equipment 5 illustrated in FIG. 1. FIG. 8 illustrates a hardware configuration of the equipment 5 that is an air conditioner. The equipment 5 includes an indoor unit 5a and an outdoor unit 5b. The indoor unit 5a includes a CPU 51a, a RAM 52a, a ROM 53a, an equipment communication interface 54a, an input/output interface 55a, and an air conditioning communication interface 56a. The outdoor unit 5b includes a CPU 51b, a RAM 52b, a ROM 53b, a second communication interface 54b, an input/output interface 55b, and an air conditioning communication interface 56b.

The CPUs 51a and 51b are similar to the CPU 21, the RAMs 52a and 52b are similar to the RAM 22, and the ROMs 53a and 53b are similar to the ROM 23 so that the description thereof will be omitted.

The equipment communication interface 54a is connected to the equipment communication line L3. The equipment communication interface 54a can communicate with the area terminal 4 via the equipment communication line L3. The input/output interfaces 55a and 55b are each connected to a device such as a sensor or a motor. The air conditioning communication interface 56a is connected to an air conditioning communication line L4. The air conditioning communication interface 56a can communicate with the outdoor unit 5b via the air conditioning communication line L4.

The second communication interface 54b is connected to the second communication path L2-3. The second communication interface 54b can communicate with the server 6 using a communication system such as Ethernet. The air conditioning communication interface 56b is connected to the air conditioning communication line L4. The air conditioning communication interface 56b can communicate with the indoor unit 5a via the air conditioning communication line L4.

Figure 9:
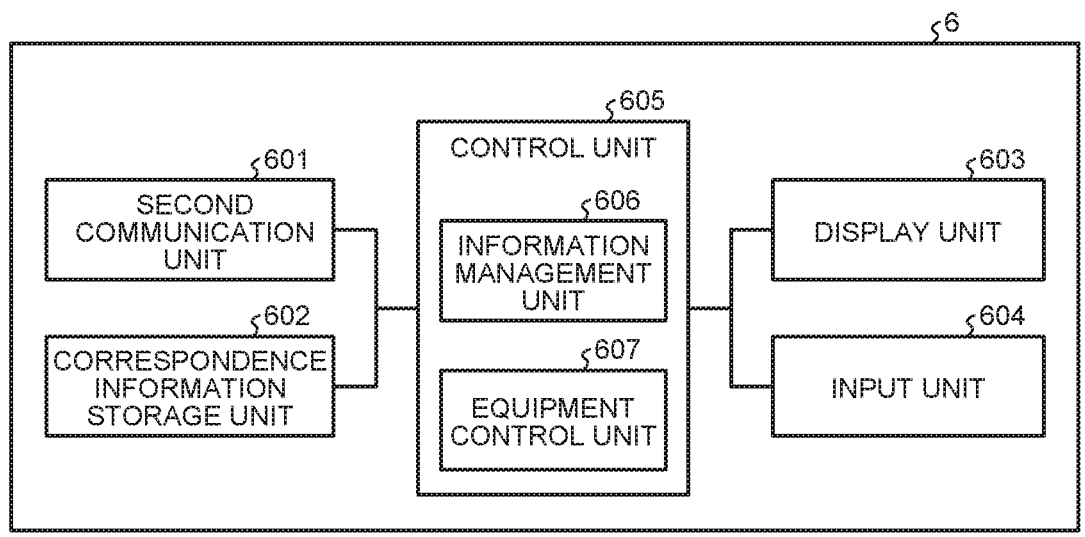
FIG. 9 is a diagram illustrating a functional configuration of a server illustrated in FIG. 1.

FIG. 9 is a diagram illustrating a functional configuration of the server 6 illustrated in FIG. 1. The server 6 includes a second communication unit 601, a correspondence information storage unit 602, a display unit 603, an input unit 604, and a control unit 605. The control unit 605 includes an information management unit 606 and an equipment control unit 607.

The second communication unit 601 can communicate with each of the mobile terminal 2, the reception terminal 3, and the equipment 5 via the second communication path L2-4. The correspondence information storage unit 602 stores correspondence information indicating the correspondence between the mobile terminal 2 and the area terminal 4.

The display unit 603 outputs a display screen in accordance with an instruction from the control unit 605. The input unit 604 receives an operation input, generates input information indicating the received operation input, and outputs the generated input information to the control unit 605.

The control unit 605 controls the overall operation of the server 6. The information management unit 606 manages the correspondence between the mobile terminal 2 and the area terminal 4, and information to be provided to the mobile terminal 2. When receiving the terminal identification information and the user identification information from the reception terminal 3, the information management unit 606 specifies the area terminal 4 installed in the room where the user stays, which is included in the user identification information received, and transmits the terminal identification information to the equipment 5 placed in the same guest room as the area terminal 4 specified. The information management unit 606 also stores the terminal identification information and user identification information received in association with each other in the correspondence information storage unit 602.

The information management unit 606 generates service information to be provided to the mobile terminal 2, and manages distribution of the service information. When generating the first information as the service information, the information management unit 606 transmits the first information generated to the equipment 5. The information management unit 606 provides the second information to the mobile terminal 2 when the mobile terminal 2 requests the service information from the server 6 via the second communication paths L2-1 and L2-4. When the content of the first information is updated, the information management unit 606 transmits the updated first information to the equipment 5. Such a configuration allows the mobile terminal 2 to obtain the latest first information.

The equipment control unit 607 controls the equipment 5 via the second communication unit 601. Specifically, the equipment control unit 607 can cause the mobile terminal 2 to display the operation menu of the equipment 5. When receiving input information for the operation menu from the mobile terminal 2, the equipment control unit 607 generates operation information for operating the equipment 5 on the basis of the input information, and transmits the generated operation information to the equipment 5 via the second communication unit 601.

Figure 10:
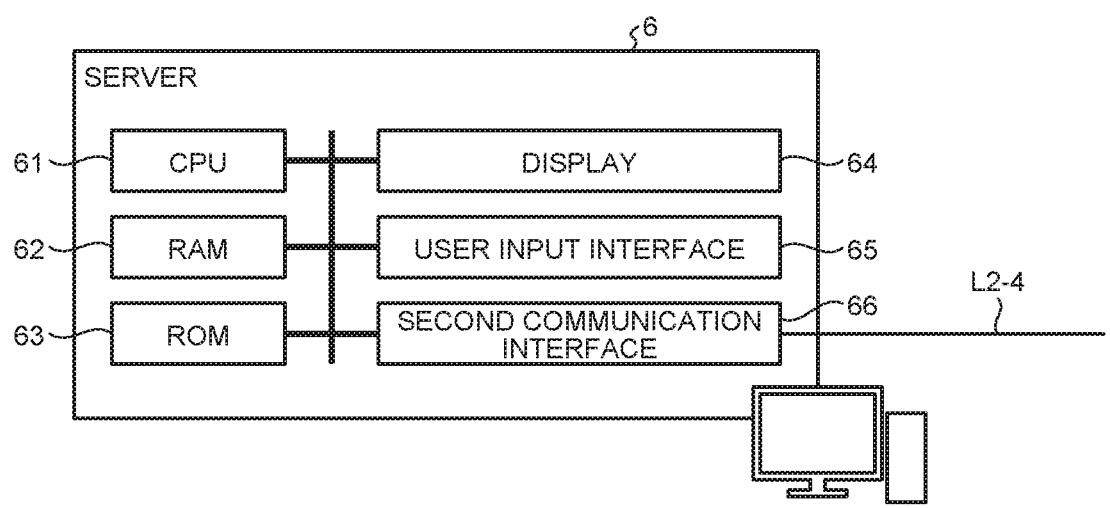
FIG. 10 is a diagram illustrating a hardware configuration of the server illustrated in FIG. 1.

FIG. 10 is a diagram illustrating a hardware configuration of the server 6 illustrated in FIG. 1. The server 6 includes a CPU 61, a RAM 62, a ROM 63, a display 64, a user input interface 65, and a second communication interface 66.

The CPU 61 is similar to the CPU 21, the RAM 62 is similar to the RAM 22, the ROM 63 is similar to the ROM 23, the display 64 is similar to the display 24, and the user input interface 65 is similar to the user input interface 35 so that the description thereof will be omitted.

The second communication interface 66 is connected to the second communication path L2-4. The second communication interface 66 can communicate with each of the mobile terminal 2, the reception terminal 3, and the equipment 5 using a communication system such as Ethernet.

The CPU 61 can implement the functions of the control unit 605, the information management unit 606, and the equipment control unit 607 by reading and executing a computer program stored in the ROM 63 or the like. The display 64 implements the function of the display unit 603. The user input interface 65 implements the function of the input unit 604. The second communication interface 66 implements the function of the second communication unit 601. The RAM 62 implements the function of the correspondence information storage unit 602.

Figure 11:
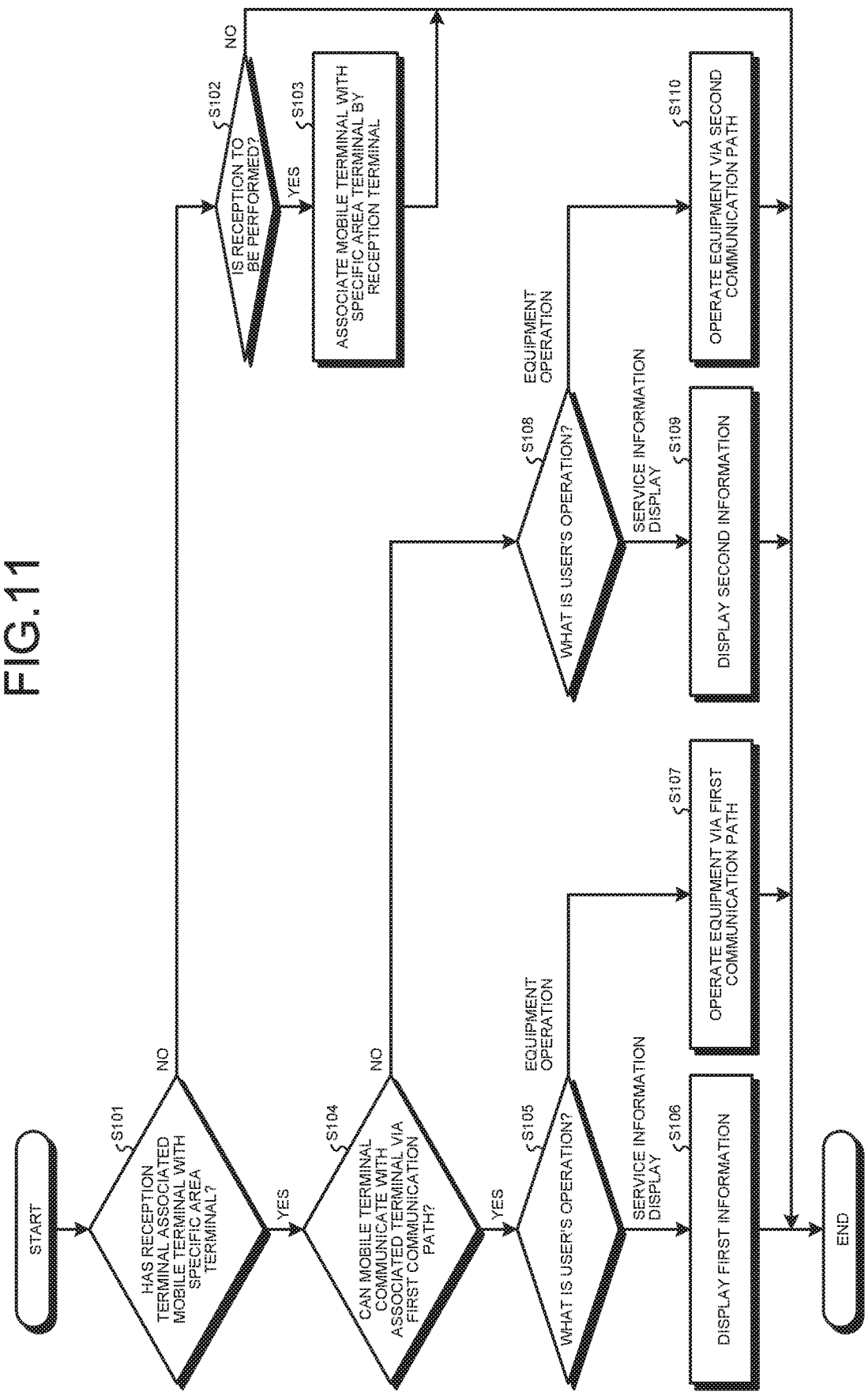
FIG. 11 is a flowchart illustrating an operation of the information providing system illustrated in FIG. 1.

Next, the operation of the information providing system 10 will be described. FIG. 11 is a flowchart illustrating the operation of the information providing system 10 illustrated in FIG. 1. The operation illustrated in FIG. 11 is started when the user operates the mobile terminal 2 such as while the user checks in at the front desk area A0 or when he moves to or leaves a guest room where he stays after checking in.

The mobile terminal 2 determines whether or not the reception terminal 3 has associated the mobile terminal 2 with a specific area terminal 4 (step S101). If the mobile terminal 2 has not been associated with a specific area terminal 4 when the user operates the mobile terminal 2 during check-in (No in step S101), the mobile terminal 2 displays a screen for selecting whether or not to go through reception and determines whether or not to go through reception on the basis of a user's input (step S102). If the mobile terminal determines to go through reception (Yes in step S102), the reception terminal 3 associates the mobile terminal 2 with a specific area terminal 4 (step S103). If the mobile terminal determines not to go through reception (No in step S102), the processing of step S103 is skipped.

If the mobile terminal 2 has been associated with the area terminal 4 by the reception terminal 3 when the user operates the mobile terminal 2 after check-in (Yes in step S101), the mobile terminal 2 determines whether or not it can communicate with the area terminal 4-1, which is the area terminal 4 associated with the mobile terminal 2, via the first communication path L1-2 (step S104).

Figure 12:
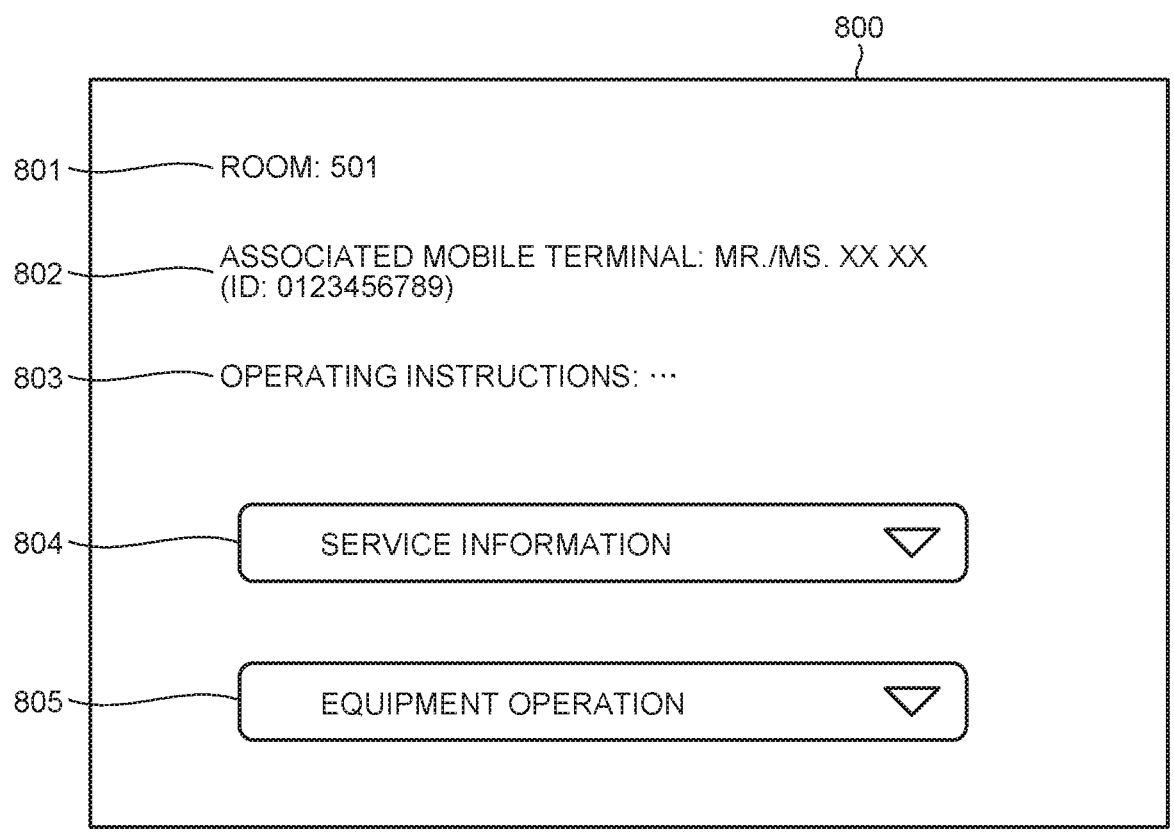
FIG. 12 is a diagram illustrating an example of a display screen displayed on the mobile terminal illustrated in FIG. 1.

If the user operates the mobile terminal 2 in the guest room where the user stays and finds out that the mobile terminal 2 can communicate with the area terminal 4-1 as the associated terminal via the first communication path L1-2 (Yes in step S104), the mobile terminal 2 obtains a display screen 800 illustrated in FIG. 12 from the area terminal 4-1, displays the display screen 800, and determines a user's operation performed on the display screen 800 (step S105). FIG. 12 is a diagram illustrating an example of the display screen 800 displayed on the mobile terminal 2 illustrated in FIG. 1. The display screen 800 includes room number information 801 for identifying the guest room where the user of the mobile terminal 2 stays, user information 802 including the name of the user, the terminal identification information, and the like, operating instructions 803, a service information display button 804, and an equipment operation menu display button 805.

If the user's operation is to display the service information (service information display in step S105), that is, if the mobile terminal 2 detects an operation on the service information display button 804 on the display screen 800, the mobile terminal 2 causes the display unit 203 to display the first information (step S106).

Figure 13:
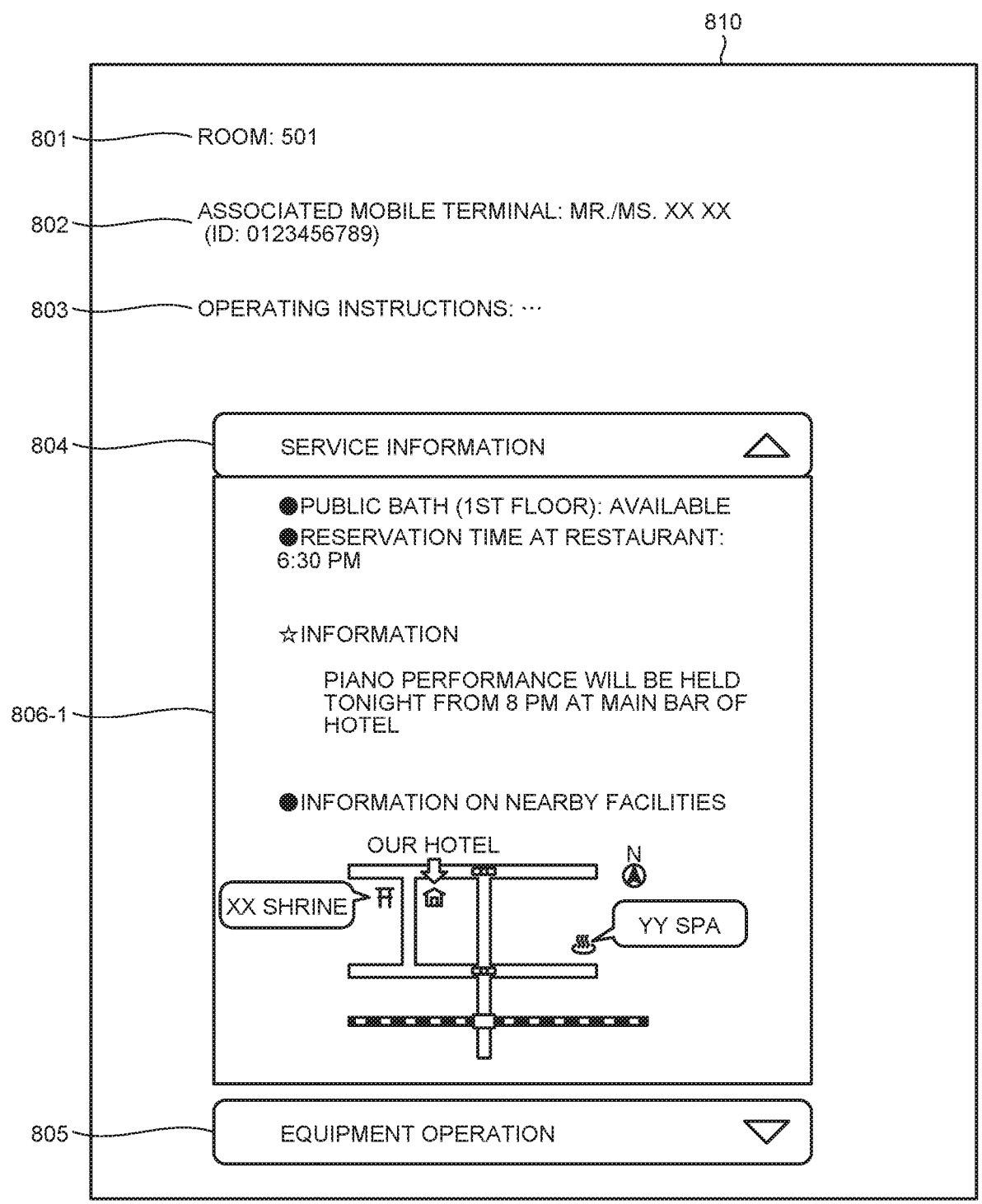
FIG. 13 is a diagram illustrating a display screen that includes first information displayed on the mobile terminal illustrated in FIG. 1 when a user is in a guest room.

FIG. 13 is a diagram illustrating a display screen 810 that includes the first information displayed on the mobile terminal 2 illustrated in FIG. 1 when the user is in the guest room. The display screen 810 includes a service information display area 806-1 in addition to the information displayed on the display screen 800 illustrated in FIG. 12. The first information is displayed in the service information display area 806-1. In the example illustrated in FIG. 13, the first information includes availability of a public bath that is a use status of a facility in the hotel, a reservation time at a restaurant that is a status of reservation at a facility in the hotel, information on an event in the hotel, and information introducing facilities around the hotel. Here, although the availability of the public bath is given, the first information is not limited to such an example and may include availability of a restaurant, a lounge, or the like.

The description refers back to FIG. 11. If the user's operation is to operate equipment (equipment operation in step S105), that is, if an operation on the equipment operation menu display button 805 is detected on the display screen 800, the mobile terminal 2 causes the display unit 203 to display the operation menu of the equipment and operates the equipment 5 via the first communication path L1-2 (step S107).

Figure 14:
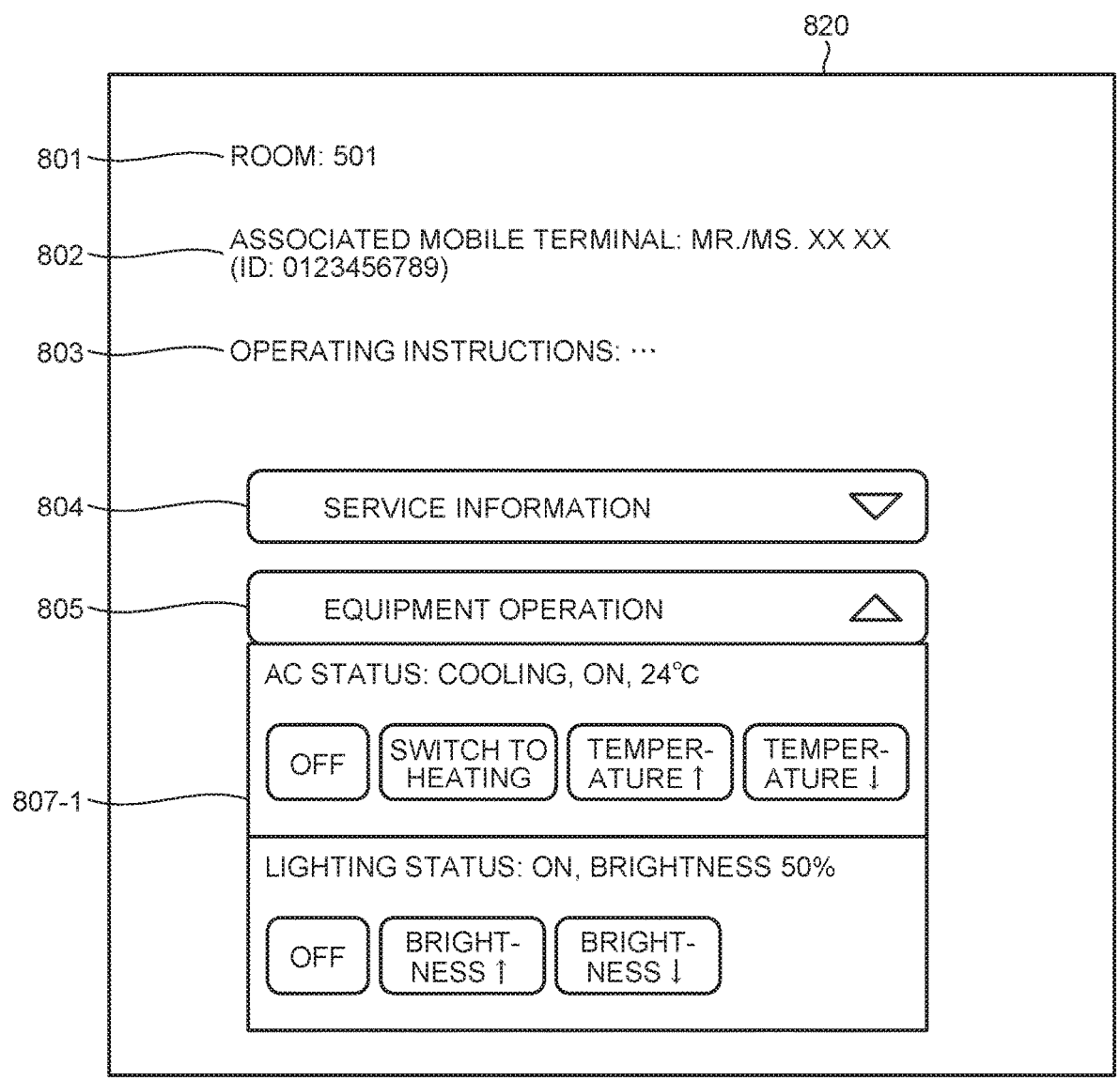
FIG. 14 is a diagram illustrating a display screen that includes an operation menu of the equipment displayed on the mobile terminal illustrated in FIG. 1 when the user is in the guest room.

FIG. 14 is a diagram illustrating a display screen 820 that includes the operation menu of the equipment 5 displayed on the mobile terminal 2 illustrated in FIG. 1 when the user is in the guest room. The display screen 820 includes an operation menu area 807-1 in addition to the information displayed on the display screen 800 illustrated in FIG. 12. The operation menu of the equipment 5 is displayed in the operation menu area 807-1.

In the example illustrated in FIG. 14, the equipment 5 includes an air conditioner abbreviated as an AC in the figure, and a lighting fixture. The operation menu area 807-1 displays current settings of the equipment 5 and operation buttons for operating the equipment 5. In the example illustrated in FIG. 14, the current settings of the air conditioner are that a cooling operation is turned on, and the temperature is set to 24° C. The operation buttons include an off button, a switch button for heating, a button for increasing the set temperature, and a button for decreasing the set temperature. Here, the off button is displayed because the air conditioner is turned on and running, but an on button is displayed when the air conditioner is turned off and not running. Also, the switch button for heating is displayed because the air conditioner is currently in the cooling operation, but a switch button for cooling is displayed during a heating operation.

Moreover, in the example illustrated in FIG. 14, the current settings of the lighting fixture are that the lighting is turned on, and the brightness is set to 50%. The operation buttons include an off button, a brightness increase button, and a brightness decrease button. Here, the off button is displayed because the lighting fixture is turned on, but an on button is displayed when the lighting fixture is turned off. Also, the operation buttons for turning on/off the lighting fixture and the brightness thereof are displayed, but a button for changing the color of the lighting may be displayed when the lighting fixture has a function of being able to change the color of the lighting.

The description refers back to FIG. 11. If the mobile terminal 2 cannot communicate with the area terminal 4-1 as the associated terminal via the first communication path L1-2 such as when the user operates the mobile terminal 2 outside the guest room where he stays (No in step S104), the mobile terminal 2 obtains the display screen 800 illustrated in FIG. 12 from the area terminal 4-1, displays the display screen 800, and determines a user's operation performed on the display screen 800 (step S108).

If the user's operation is to display the service information (service information display in step S108), that is, if an operation on the service information display button 804 is detected on the display screen 800, the mobile terminal 2 causes the display unit 203 to display the second information (step S109).

Figure 15:
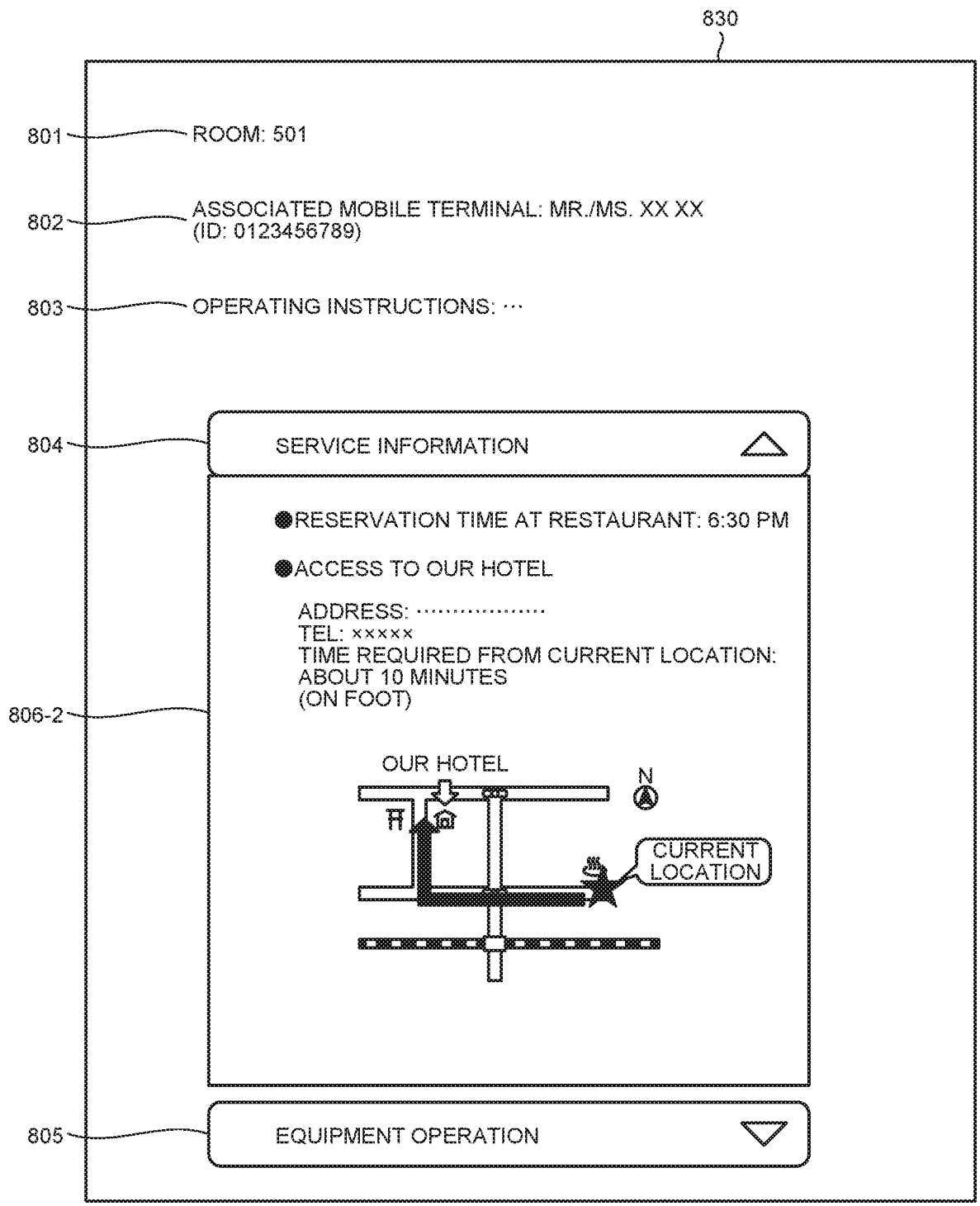
FIG. 15 is a diagram illustrating a display screen that includes second information displayed on the mobile terminal illustrated in FIG. 1 when the user is not in the guest room.

FIG. 15 is a diagram illustrating a display screen 830 that includes the second information displayed on the mobile terminal 2 illustrated in FIG. 1 when the user is not in the guest room. The display screen 830 includes a service information display area 806-2 in addition to the information displayed on the display screen 800 illustrated in FIG. 12. The second information is displayed in the service information display area 806-2. In the example illustrated in FIG. 15, the second information includes a reservation time at a restaurant, which is a status of reservation at a facility in the hotel, and information on access to the hotel. The information on access to the hotel is information that assists the user to move to the area where the area terminal 4-1 being the associated terminal is placed, that is, to the hotel, and can include address and phone number of the hotel, a map indicating a travel route to the hotel, and the like. Also, in the example illustrated in FIG. 15, the second information includes the time required to move from the current location to the hotel based on location information indicating the current location of the mobile terminal 2.

The description refers back to FIG. 11. If the user's operation is to operate equipment (equipment operation in step S108), that is, if an operation on the equipment operation menu display button 805 is detected on the display screen 800, the mobile terminal 2 causes the display unit 203 to display the operation menu of the equipment and operates the equipment 5 via the second communication path L2-1 (step S110).

Figure 16:
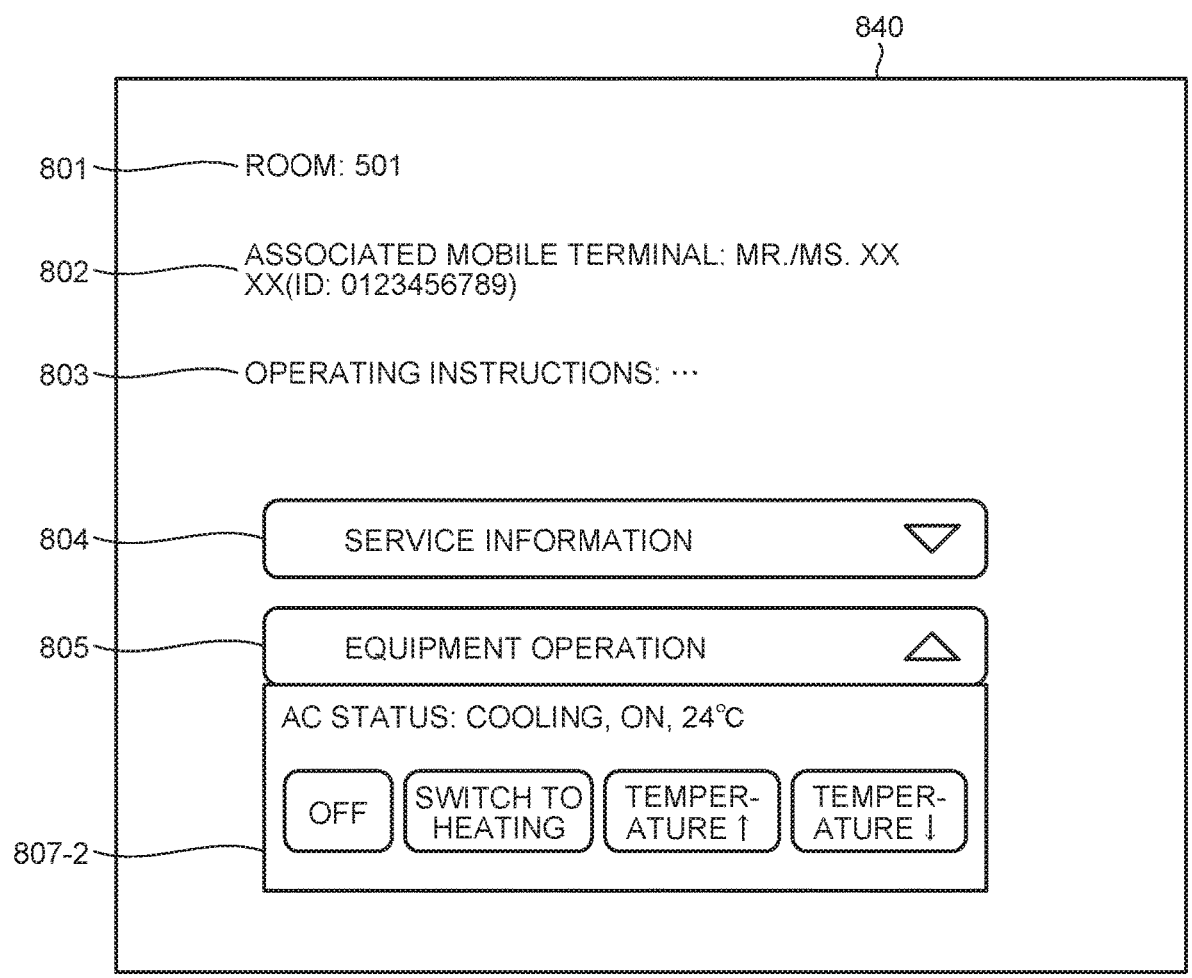
FIG. 16 is a diagram illustrating a display screen that includes an operation menu of the equipment displayed on the mobile terminal illustrated in FIG. 1 when the user is not in the guest room.

FIG. 16 is a diagram illustrating a display screen 840 that includes the operation menu of the equipment 5 displayed on the mobile terminal 2 illustrated in FIG. 1 when the user is not in the guest room. The display screen 840 includes an operation menu area 807-2 in addition to the information displayed on the display screen 800 illustrated in FIG. 12. The operation menu of the equipment 5 is displayed in the operation menu area 807-2. In a comparison between FIGS. 14 and 16, the operation menu area 807-1 illustrated in FIG. 14 displays the operation buttons for the lighting fixture in addition to those for the air conditioner, whereas the operation menu area 807-2 illustrated in FIG. 16 does not display the operation buttons for the lighting fixture but displays the operation buttons for the air conditioner. The mobile terminal 2 may thus change the operation menu of the equipment to be displayed on the basis of whether or not the mobile terminal 2 can communicate with the area terminal 4-1 being the associated terminal via the first communication path L1-2. Specifically, the mobile terminal 2 can change the type of the equipment 5 that can be operated on the basis of whether or not the mobile terminal 2 can communicate with the area terminal 4-1 being the associated terminal via the first communication path L1-2.

Figure 17:
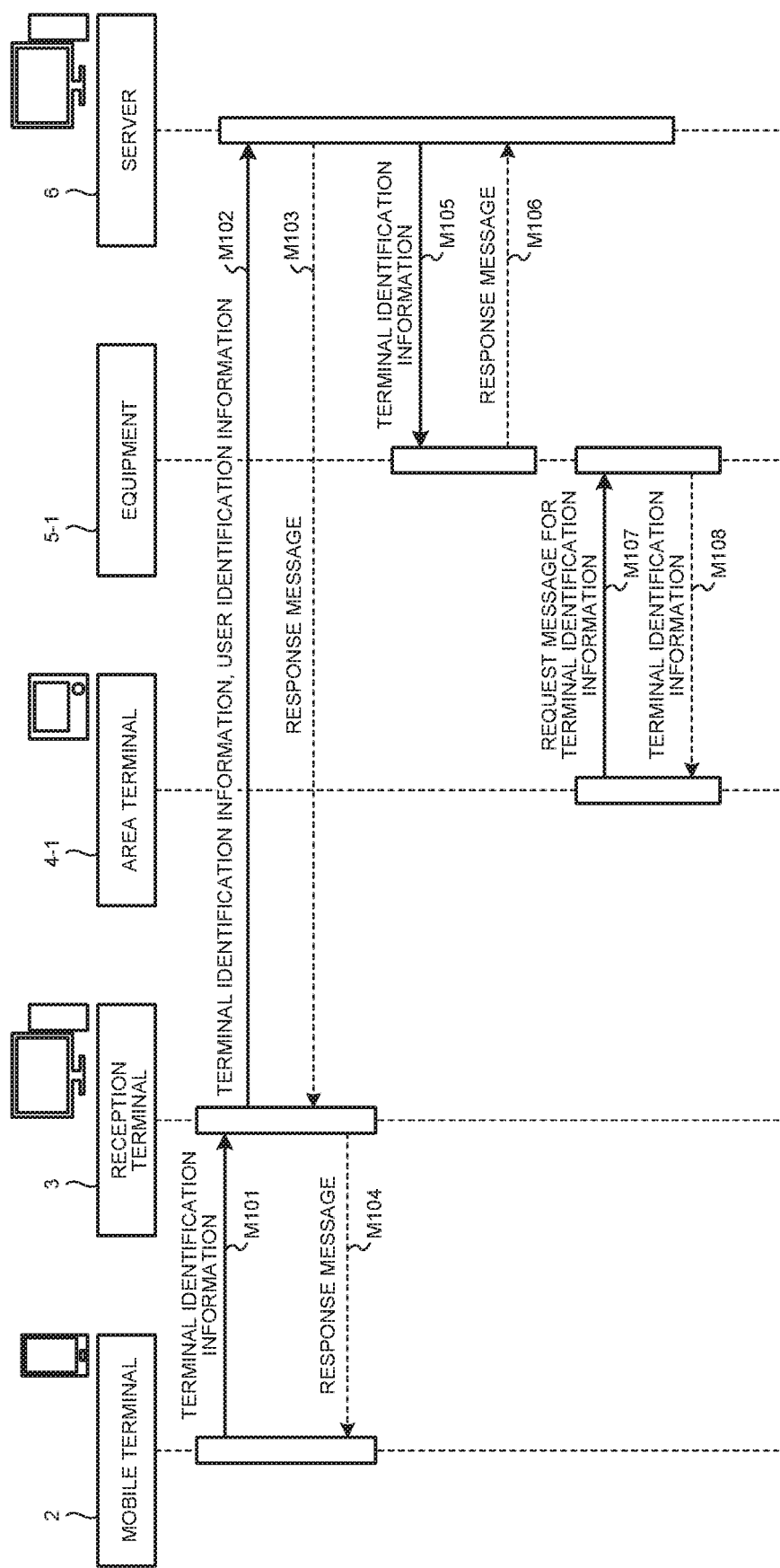
FIG. 17 is a data flow diagram illustrating a data flow in a step of reception illustrated in FIG. 11.

Next, a data flow in each scene using the information providing system 10 will be described. FIG. 17 is a data flow diagram illustrating a data flow at the time of reception in step S103 illustrated in FIG. 11.

First, the registration unit 208 of the mobile terminal 2 transmits a message M101 including the terminal identification information to the reception terminal 3. The reception processing unit 305 of the reception terminal 3 transmits, to the server 6, a message M102 including the terminal identification information received and the user identification information that is input using the input unit 304.

The information management unit 606 of the server 6 extracts the terminal identification information and the user identification information included in the message M102 received, causes the correspondence information storage unit 602 to store the information, and returns a response message M103 to the reception terminal 3. Upon receiving the response message M103, the reception terminal 3 returns a response message M104 to the mobile terminal 2. The information management unit 606 transmits a message M105 including the stored terminal identification information to the equipment 5-1 that is placed in the room where the user stays as indicated by the user identification information. Upon receiving the message M105, the equipment 5-1 stores the terminal identification information included in the message M105 received, and returns a response message M106 to the server 6.

The information management unit 406 of the area terminal 4-1 periodically transmits a request message M107 for the terminal identification information to the equipment 5-1. When possessing the terminal identification information received from the server 6, the equipment 5-1 returns a message M108 including the terminal identification information to the area terminal 4-1 in response to the request message M107.

Figure 18:
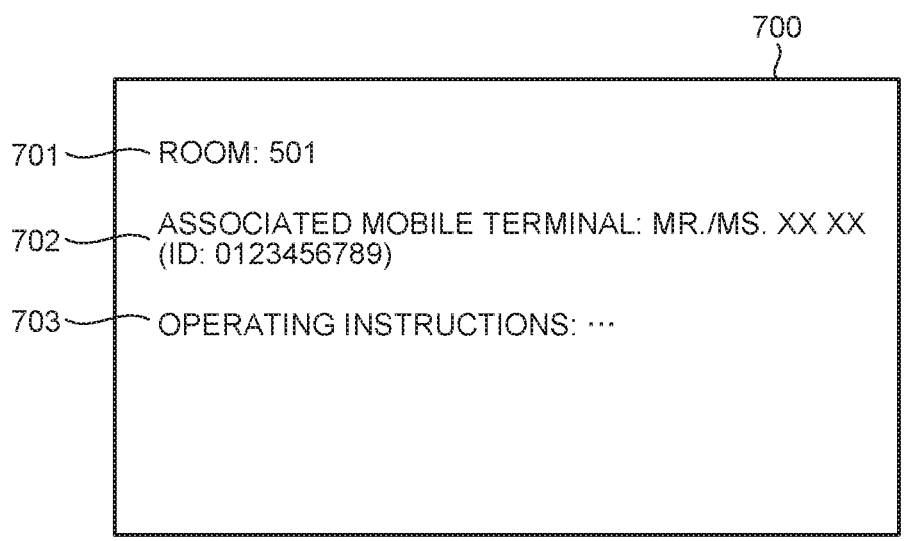
FIG. 18 is a diagram illustrating an example of a display screen displayed on the area terminal illustrated in FIG. 1.

By receiving the message M108, the area terminal 4-1 can grasp the terminal identification information and the user identification information of the mobile terminal 2 associated with the area terminal 4-1. The area terminal 4-1 can thus cause the display unit 403 to display at least one of the terminal identification information and the user identification information. FIG. 18 is a diagram illustrating an example of a display screen 700 displayed on the area terminal 4-1 illustrated in FIG. 1. The display screen 700 can include room number information 701, user information 702 associated with the area terminal 4-1, and operating instructions 703. In the example illustrated in FIG. 18, the user information 702 includes the name of the user as the user identification information and a terminal ID as the terminal identification information. When a user ID is assigned to each user, the user ID may be displayed instead of the terminal identification information.

The information providing system 10 exchanges the data as described above to be able to associate the mobile terminal 2 with the area terminal 4-1. Also, the area terminal 4-1 can know the mobile terminal 2 associated with the area terminal 4-1.

Figure 19:
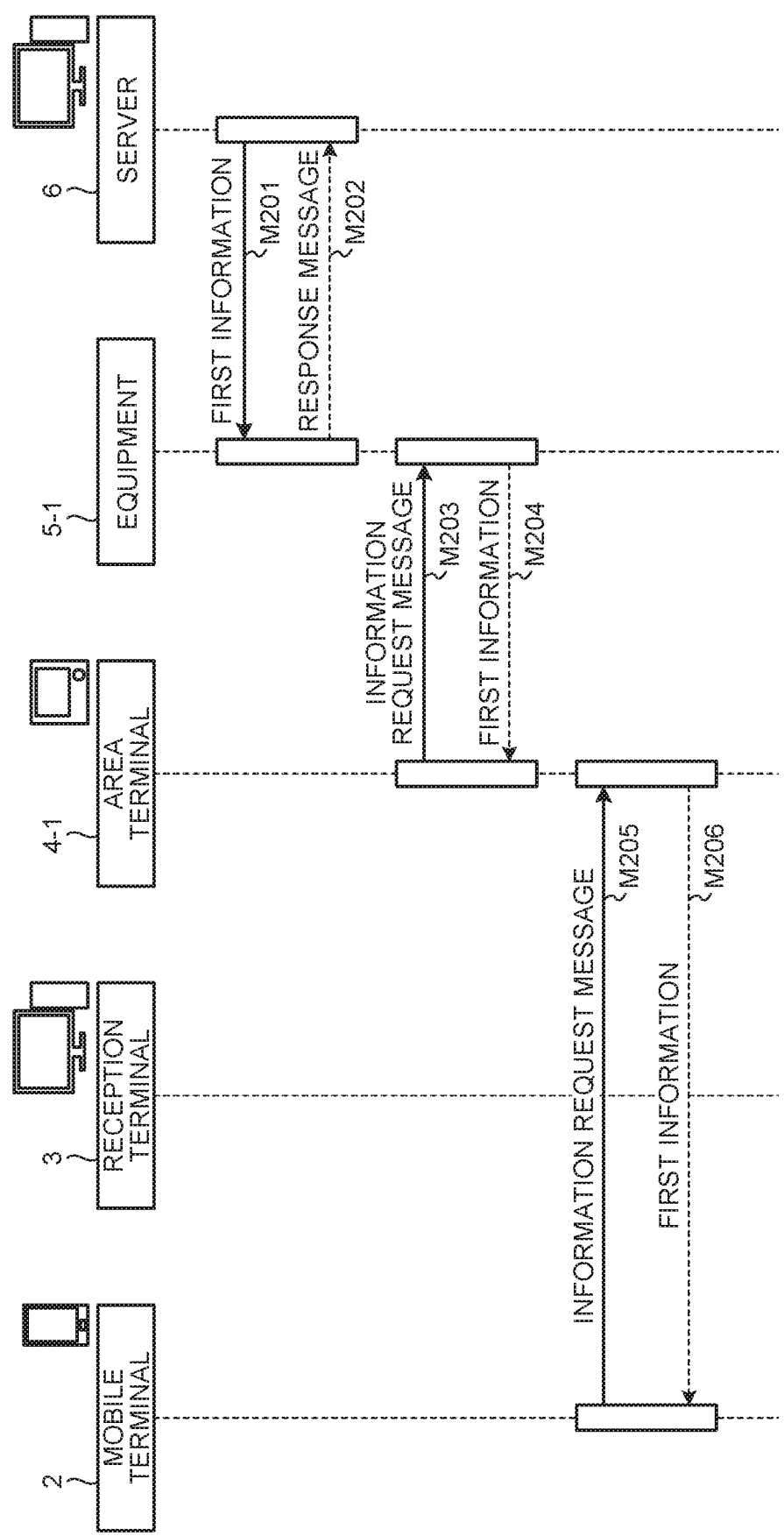
FIG. 19 is a data flow diagram illustrating a data flow in a step of displaying first information, the step being illustrated in FIG. 11.

FIG. 19 is a data flow diagram illustrating a data flow at the time of displaying the first information in step S106 illustrated in FIG. 11. Each time the information management unit 606 of the server 6 generates the first information, which is distributed when the user is in the guest room of the hotel, among the service information provided to each mobile terminal 2, a message M201 including the first information is transmitted to the equipment 5-1 placed in the guest room where the user stays. Upon receiving the message M201, the equipment 5-1 returns a response message M202 to the server 6 and at the same time stores the first information included in the message M201 received.

The information management unit 406 of the area terminal 4-1 periodically transmits an information request message M203 to the equipment 5-1. When storing the first information transmitted from the server 6, the equipment 5-1 returns a message M204 including the first information to the area terminal 4-1 in response to the information request message M203. The information management unit 406 of the area terminal 4-1 stores the first information included in the message M204.

The mobile terminal 2 transmits an information request message M205 to the area terminal 4-1 when activating an application installed in the mobile terminal 2, for example. When storing the first information, the information management unit 406 of the area terminal 4-1 returns a message M206 including the first information to the mobile terminal 2 in response to the information request message M205.

The area terminal 4-1 exchanges the data as described above to be able to keep the first information provided to the mobile terminal 2 up to date. Also, the mobile terminal 2 can obtain the first information from the area terminal 4-1 via the first communication path L1-2.

FIG. 20 is a data flow diagram illustrating a data flow at the time of displaying the second information in step S109 illustrated in FIG. 11. The mobile terminal 2 accesses the server 6 via the second communication path L2-1 when unable to communicate with the area terminal 4-1 via the first communication path L1-2. Specifically, the display control unit 206 of the mobile terminal 2 transmits an information request message M301 to the server 6. The information management unit 606 of the server 6 returns a message M302 including the second information to the mobile terminal 2 in response to the information request message M301.

The mobile terminal 2 exchanges the data as described above to be able to obtain the service information directly from the server 6 even when unable to obtain the service information via the first communication path L1-2. Moreover, the service information obtained here is the second information different from the first information that is provided when the mobile terminal 2 can communicate with the area terminal 4-1 via the first communication path. The information provided is changed as described above depending on whether or not the mobile terminal 2 can communicate with the area terminal 4-1 via the first communication path L1-2, whereby the service of the hotel as the facility where the area terminal 4 is installed can be improved, and also the convenience of the user can be improved.

FIG. 21 is a data flow diagram illustrating a data flow at the time of operating the equipment via the first communication path L1-2 in step S107 illustrated in FIG. 11. Upon receiving input information for the equipment operation menu, the equipment operation unit 207 of the mobile terminal 2 generates operation information for operating the equipment 5-1 on the basis of the input information and transmits a message M401 including the operation information generated to the area terminal 4-1. The area terminal 4-1 returns a response message M402 to the mobile terminal 2 in response to the message M401.

The area terminal 4-1 transmits a message M403 including the operation information, which is included in the message M401 received, to the equipment 5-1. The equipment 5-1 controls the equipment 5-1 according to the operation information included in the message M403 received, and also returns a response message M404 to the area terminal 4-1.

By exchanging the data as described above, the user of the mobile terminal 2 can perform an operation on the equipment 5-1 such as changing the settings of the equipment 5-1 by operating the mobile terminal 2. The user can operate the equipment 5 installed in the hotel where the user stays for a limited period of time by using the mobile terminal 2 the user is familiar with, whereby the convenience of the user is improved.

FIG. 22 is a data flow diagram illustrating a data flow at the time of operating the equipment via the second communication path L2-1 in step S110 illustrated in FIG. 11. Upon receiving input information for the equipment operation menu, the equipment operation unit 207 of the mobile terminal 2 generates operation information for operating the equipment 5-1 on the basis of the input information and transmits a message M501 including the operation information generated to the server 6. The server 6 receives the message M501, extracts the operation information included in the message M501 received, and returns a response message M502 to the mobile terminal 2.

The server 6 transmits, to the equipment 5-1, a message M503 including the operation information extracted from the message M501. The equipment 5-1 receives the message M503, controls the equipment 5-1 according to the operation information included in the message M503 received, and returns a response message M504 to the server 6.

As described above, according to the embodiment of the present invention, the mobile terminal 2 can change the service information displayed on the mobile terminal 2 on the basis of the result of the determination on whether or not communication can be established with the area terminal 4-1 associated with the mobile terminal 2 via the first communication path L1-2. As a result, different service information can be provided on the basis of whether or not the user is in the area associated with the user, and information more suitable for the situation of the user can be provided. Therefore, a provider of the service information such as the hotel in the above embodiment can create a new differentiated service.

Moreover, according to the above embodiment, the mobile terminal 2 owned by the user can be used to operate the equipment 5-1 in the area where the associated terminal is placed. Therefore, the user can operate the equipment 5-1 using the mobile terminal 2 he is familiar with in the user's language even if, for example, the language used in the place of stay is different from the user's language, whereby the convenience is improved.

According to the above embodiment, the equipment 5 is the air conditioner or the lighting fixture, but the present embodiment is not limited to such an example. The equipment 5 may be any device that can be operated using a remote control and may be, for example, a water heater, an electric blind, a television receiver, or other home appliances.

The above embodiment illustrates an example of the operation menu of the equipment 5, but the present embodiment is not limited to such an example. In the case where the equipment 5 is the air conditioner, the mobile terminal 2 may accept an input of not only the set temperature specified by a number but also a more abstract operation such as "relatively cool" or "relatively warm", or information such as "sensitive to heat" that is a personal preference, and automatically control the equipment 5 on the basis of the input information.

Moreover, the display screen displayed on the mobile terminal 2 is not limited to the example illustrated in the above embodiment. For example, the mobile terminal 2 may be able to make a request to the information providing system 10 such as addition of amenity items, borrowing of equipment such as a humidifier, a room service, or a reservation of a meal time.

The configuration illustrated in the above embodiment merely illustrates an example of the content of the present invention, and can thus be combined with another known technique or partially omitted and/or modified without departing from the scope of the present invention.

In the above embodiment, the user identification information includes the information indicating the room where the user stays and the name of the user, and the name of the user is displayed on the area terminal 4, but the present embodiment is not limited to such an example. The user identification information need only include at least the information for specifying the room where the user stays, and need not include the name of the user.

Moreover, in the above embodiment, the mobile terminal 2 obtains the second information from the server 6 via the second communication path L2-1 when unable to communicate with the associated terminal via the first communication path L1-2, but the present invention is not limited to such an example. It is sufficient that the information displayed on the mobile terminal 2 can be changed on the basis of whether or not the mobile terminal 2 can communicate with the associated terminal via the first communication path L1-2. For example, the display control unit 206 can obtain the second information from the server 6 and store the second information when the mobile terminal 2 can communicate with the associated terminal via the first communication path L1-2, and can cause the display unit 203 to display the second information stored when the mobile terminal 2 can no longer communicate with the associated terminal via the first communication path L1-2. In this case, the display control unit 206 can cause the display unit 203 to display the second information offline.

Moreover, in the above embodiment, the mobile terminal 2 obtains the service information via the first communication path L1-2 when able to communicate with the associated terminal via the first communication path L1-2, but the present embodiment is not limited to such an example. The display control unit 206 can obtain the service information via the second communication path L2-1 regardless of the location of the mobile terminal 2.

Moreover, in the above embodiment, the hotel is described as an example of the accommodation facility, but the present invention is not limited to such an example. The accommodation facility may be an inn, a guest house, a room in an ordinary house rented out by a service called vacation rental, or the like. When the accommodation facility is a room in an ordinary house, the plurality of areas is not limited to areas in the same facility but may be a plurality of rooms individually located in a plurality of facilities. The area terminal 4 is placed in each of the plurality of rooms using the information providing system 10.

Moreover, in the above embodiment, the area terminal 4 is placed in each guest room of the accommodation facility, but the present invention is not limited to such an example. Besides the accommodation facility, the area terminal 4 may be placed in a facility that can be rented out and used for a predetermined period such as a meeting room for rent or a banquet hall.

Moreover, in the above embodiment, the hotel staff operates the reception terminal 3, but the present invention is not limited to such an example. In the case where the mobile terminal 2 holds information specifying the room where the user stays, the user transmits the information specifying the room where the user stays and the terminal identification information to the reception terminal 3. In this case, the mobile terminal 2 can be associated with the area terminal 4 without the hotel staff operating the reception terminal 3.

The invention claimed is:

1. A mobile terminal capable of obtaining information provided from a server, the mobile terminal comprising:
   a processor;
   a communication interface capable of communicating with, via a first communication path using short-range wireless communication, an associated terminal placed in one of a plurality of areas, the associated terminal being an area terminal placed in the area rented out and used by a user of the mobile terminal among the plurality of areas, and the associated terminal being a terminal associated with the mobile terminal; and a display; wherein the processor is configured to receive, from the server, service information, the service information comprising first information and second information different from the first information, determine whether the communication interface is able to communicate with the associated terminal via the first communication path;

when the communication interface is determined to be able to communicate with the associated terminal via the first communication path, control the display to display the first information as the service information, when the communication interface is determined to be unable to communicate with the associated terminal via the first communication path, control the display to display the second information as the service information, and obtain the second information from the associated terminal via the first communication path while the communication interface is determined to be able to communicate with the associated terminal via the first communication path.

2. The mobile terminal according to claim 1, wherein the processor is further configured to obtain the second information from the server via a second communication path that is a communication path different from the first communication path.

3. The mobile terminal according to claim 1, wherein the processor is further programmed to:

transmit identification information identifying the mobile terminal to a reception terminal that associates the associated terminal with the mobile terminal.

4. The mobile terminal according to claim 1, wherein the associated terminal is configured to communicate with equipment installed in the area in which the associated terminal is placed, and the processor is further configured to receive an operation of changing a state of the equipment.

5. The mobile terminal according to claim 4, wherein the processor is further configured to, when the communication interface is determined to be unable to communicate with the associated terminal via the first communication path, transmit using the communication interface operation information indicating an operation received to the associated terminal via a second communication path different from the first communication path.

6. The mobile terminal according to claim 4, wherein the processor is further configured to control the display to display an operation menu of the equipment.

7. The mobile terminal according to claim 6, wherein the processor is further configured to change the operation menu of the equipment displayed on the display depending on whether or not the communication interface is determined to be able to communicate with the associated terminal via the first communication path.

8. The mobile terminal according to claim 1, wherein the area terminal is a remote control of equipment placed in the area.

9. The mobile terminal according to claim 1, wherein the mobile terminal automatically starts communication with the associated terminal when detecting that the mobile terminal is located within a range in which the mobile terminal can wirelessly communicate with the associated terminal.

10. The mobile terminal according to claim 1, wherein the first information includes information required when a user of the mobile terminal is in the area in which the associated terminal is placed, and the second information includes information required when the user is not in the area in which the associated terminal is placed.

11. An information providing system comprising:

a server;

a plurality of area terminals placed in corresponding ones of a plurality of areas that can be rented out and used for a predetermined period, and a mobile terminal that is capable of obtaining information provided from the server and is owned by a user who rents out and uses one of the plurality of areas, wherein the mobile terminal further comprises a processor:

a communication interface capable of communicating with, via a first communication path using short-range wireless communication, an associated terminal in one of the plurality of areas, the associated terminal being placed in the one of the plurality of areas, being a terminal associated with the mobile terminal, and being one of the plurality of area terminals; and a display; wherein the processor is configured to receive, from the server, service information, the service information being provided from the server and comprising first information and second information different from the first information, determine whether the communication interface is able to communicate with the associated terminal via the first communication path;

when the communication interface is determined to be able to communicate with the associated terminal via the first communication path, control the display to display the first information as the service information, and when the communication interface is determined to be unable to communicate with the associated terminal via the first communication path, control the display to display the second information as the service information, and obtain the second information from the associated terminal via the first communication path while the communication interface is determined to be able to communicate with the associated terminal via the first communication path.

12. The information providing system according to claim 11, further comprising:

a reception terminal that associates one of the plurality of area terminals with the mobile terminal.

13. The information providing system according to claim 12, wherein the reception terminal transmits, to the associated terminal, identification information of the mobile terminal or identification information of a user of the mobile terminal, and the associated terminal includes a display capable of displaying the identification information of the mobile terminal or the identification information of a user of the mobile terminal.

* * * * *